United States Patent
Moyne et al.

(10) Patent No.: US 11,789,427 B2
(45) Date of Patent: Oct. 17, 2023

(54) VALUE-INDEPENDENT SITUATION IDENTIFICATION AND MATCHING

(71) Applicant: Applied Materials, Inc., Santa Clara, CA (US)

(72) Inventors: James Robert Moyne, Canton, MI (US); Jimmy Iskandar, Fremont, CA (US)

(73) Assignee: Applied Materials, Inc., Santa Clara, CA (US)

( * ) Notice: Subject to any disclaimer, the term of this patent is extended or adjusted under 35 U.S.C. 154(b) by 80 days.

(21) Appl. No.: 17/511,450

(22) Filed: Oct. 26, 2021

(65) Prior Publication Data
US 2023/0126028 A1    Apr. 27, 2023

(51) Int. Cl.
*G05B 19/4099* (2006.01)
*G06N 20/00* (2019.01)

(52) U.S. Cl.
CPC ......... *G05B 19/4099* (2013.01); *G06N 20/00* (2019.01); *G05B 2219/45031* (2013.01)

(58) Field of Classification Search
CPC ...... G05B 19/4099; G05B 2219/45031; G06N 20/00
See application file for complete search history.

(56) References Cited

U.S. PATENT DOCUMENTS

| | | | |
|---|---|---|---|
| 6,650,955 B1 * | 11/2003 | Sonderman | G05B 19/41865 700/109 |
| 2017/0109646 A1 * | 4/2017 | David | G03F 7/70625 |
| 2018/0144211 A1 | 5/2018 | Ross et al. | |
| 2018/0356807 A1 * | 12/2018 | Honda | G05B 19/41885 |
| 2019/0278188 A1 | 9/2019 | Ypma et al. | |
| 2019/0312734 A1 | 10/2019 | Wentz et al. | |
| 2021/0116895 A1 | 4/2021 | Paul | |

OTHER PUBLICATIONS

International Search Report and Written Opinion received for PCT Application No. PCT/US2022/047603, dated Jan. 31, 2023.
Li, et al. "Combining Feature Extraction-Based and Full Trace Analysis Capabilities in Fault Detection: Methods and Comparative Analysis." APCSM Conference, Oct. 6-7, 2020, 35 pages.
Li, et al. "Combining Feature Extraction-Based and Full Trace Analysis Capabilities in Fault Detection: Methods and Comparative Analysis" IEEE ASMC, 2021, downloaded on Aug. 24, 2021, 6 pages.

(Continued)

*Primary Examiner* — Gary Collins
(74) *Attorney, Agent, or Firm* — Lowenstein Sandler LLP

(57) ABSTRACT

A method includes receiving one or more fingerprint dimensions to be used to generate a fingerprint. The method further includes receiving trace data associated with a manufacturing process. The method further includes applying the one or more fingerprint dimensions to the trace data to generate at least one feature. The method further includes generating the fingerprint based on the at least one feature. The method further includes causing, based on the fingerprint, performance of a corrective action associated with one or more manufacturing processes.

20 Claims, 9 Drawing Sheets

(56) References Cited

OTHER PUBLICATIONS

Moyne, et al. "A Requirements Driven Digital Twin Framework: Specification and Opportunities." IEEE Access, May 21, 2020, 21 pages.
Cai, et al. "A Framework for Semi-Automated Fault Detection Configuration with Automated Feature Extraction and Limits Setting." IEEE, downloaded on Aug. 24, 2021, 6 pages.
"Cyer-Physical System." https://ptolemy.berkeley.edu/projects/cps/, Berkeley CPS Publications, Oct. 26, 2021, 3 pages.
Li, et al. "Combining Feature Extraction-Based and Full Trace Analysis Capabilities in Fault Detection: Methods and Comparative Analysis." APCSM 2020, Abstract 20018, 6 pages.

* cited by examiner

VALUE-INDEPENDENT SITUATION IDENTIFICATION AND MATCHING

TECHNICAL FIELD

The present disclosure relates to situation identification and matching, and in particular to value-independent situation identification and matching.

BACKGROUND

Products may be produced by performing one or more manufacturing processes using manufacturing equipment. For example, semiconductor manufacturing equipment may be used to produce substrates via semiconductor manufacturing processes. Products are to be produced with particular properties, suited for a target application. Sensor data is often monitored in association with substrate manufacturing processes.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular embodiments of the disclosure or any scope of the claims. Its sole purpose is to present some concepts of the disclosure in a simplified form as a prelude to the more detailed description that is presented later.

In one aspect of the disclosure, a method includes receiving one or more fingerprint dimensions to be used to generate a fingerprint. The method further includes receiving trace data associated with a manufacturing process. The method further includes applying the one or more fingerprint dimensions to the trace data to generate at least one feature. The method further includes generating the fingerprint based on the at least one feature. The method further includes causing, based on the fingerprint, performance of a corrective action associated with one or more manufacturing processes.

In another aspect of the disclosure, a non-transitory machine-readable storage medium stores instructions which, when executed, cause a processing device to perform operations. The operations include receiving one or more fingerprint dimensions to be used to generate a fingerprint. The operations further include receiving trace data associated with a manufacturing process. The operations further include applying the one or more fingerprint dimensions to the trace data to generate at least one feature. The operations further include generating a fingerprint based on the at least one feature. The operations further include causing, based on the fingerprint, performance of a corrective action associated with one or more manufacturing processes.

In another aspect of the disclosure, a system includes memory and a processing device coupled to the memory. The processing device is to receive one or more fingerprint dimensions to be used to generate a fingerprint. The processing device is further to receive trace data associated with a manufacturing process. The processing device is further to apply the one or more fingerprint dimensions to the trace data to generate at least one feature. The processing device is further to generate the fingerprint based on the at least one feature. The processing device is further to cause, based on the fingerprint, performance of a corrective action associated with one or more manufacturing processes.

BRIEF DESCRIPTION OF THE DRAWINGS

The present disclosure is illustrated by way of example, and not by way of limitation in the figures of the accompanying drawings.

DETAILED DESCRIPTION

Figure 1:
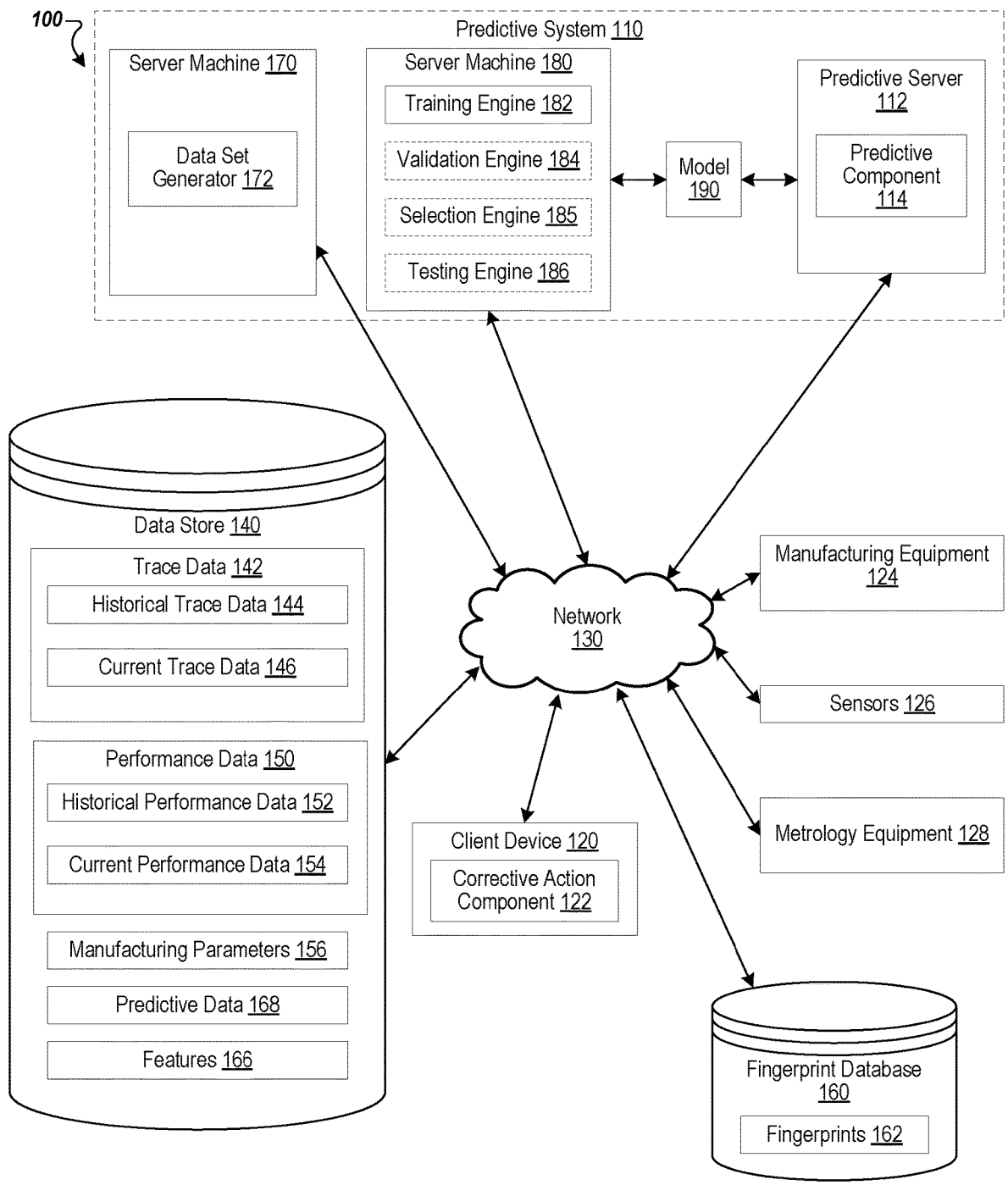
FIG. 1 is a block diagram illustrating an exemplary system architecture, according to certain embodiments.

Described herein are technologies related to value-independent (e.g., data agnostic) situation identification, verification, validation and matching (e.g., fingerprint generation for performance of corrective actions). Manufacturing equipment is used to process products. Aspects of the present disclosure are related to improving manufacturing processes, and may be applied to a wide variety of manufacturing applications. As an illustrative example, substrate manufacturing equipment, used to process substrates (e.g., wafers, semiconductors), will be discussed, but the scope of examples shall not be construed to limit the disclosure beyond the scope of the claims. The properties of processed substrates are to meet target properties for specific functionalities. Manufacturing parameters are to be selected to attempt to produce substrates that meet target properties. There are many manufacturing parameters (e.g., hardware parameters, process parameters, etc.) that contribute to the resulting properties of substrates. During manufacturing, sensors provide sensor data (e.g., temperature, pressure, etc.).

Conventionally, users attempt to determine associations between trends in sensor data and properties of finished substrates. For instance, a user may decide that a threshold temperature usually results in a particular anomaly of a finished product or a problem with the substrate processing equipment. The associations between sensor data and anomalies associated with substrate processing equipment can be inconvenient or impossible to determine or transfer to other substrate processing equipment. Concerns about security of trade secret information, for example, can make preservation of these associations inconvenient or prohibited. For other substrate processing equipment, this process is to be repeated to attempt to determine associations between sensor data and anomalies. This repetition wastes time, energy, and material. In some examples, users of other substrate processing equipment fail to determine the associations or may determine erroneous associations. This results in underperforming products and also leads to waste of material, energy, and time.

The methods and devices of the present disclosure address at least some of these deficiencies of conventional solutions. In some embodiments, a processing device receives trace data (e.g., from sensors) associated with producing substrates. The sensor data may be indicative of conditions (e.g., temperature, pressure, flow, voltage, etc.) of substrate processing equipment (e.g., during a substrate manufacturing process). The processing device determines at least one feature associated with the trace data (e.g., extracts features from the trace data). Features may be particular shapes, such as ramps or spikes, in the trace data. Features may include starting location (e.g., time of feature onset), starting value, height, etc. of the trace data. Features may include deviations from target trace data, such as data points in the trace data that differ from the average of data points from multiple sets of trace data by more than a threshold amount (e.g., a threshold number of standard deviations from average, the threshold number tuned for a particular facility, application, or the like). Many other types of features are possible. The processing device generates a fingerprint based on the feature(s). A feature included in the fingerprint may be verified to belong to a particular fingerprint dimension. A fingerprint dimension includes a pattern used to process data that is designed to conform to certain standards. The standards may be related to preserving trade secrets associated with the trace data, obscuring measured data values of the trace data, etc. The fingerprint dimension may be applied to trace data associated with a manufacturing process (e.g., a pattern for extracting information from the trace data may be applied to the trace data) in order to generate a feature. The fingerprint may include features conforming to many different fingerprint dimensions. In some embodiments, the fingerprint dimensions included in a fingerprint may be customized for the trace data (e.g., source of the trace data, process associated with the trace data, product processed under conditions captured by the trace data, etc.). The fingerprint is data agnostic (e.g., value-independent, not indicative of data values of the trace data). The processing device causes, based on the fingerprint, performance of a corrective action associated with substrate production via substrate processing equipment. In some embodiments, inclusion of a feature in a fingerprint, inclusion of a fingerprint dimension as a possible part of a fingerprint, etc., may be validated to determine capability to contribute to analytical solutions (e.g., ability to predict corrective actions that improve performance of manufacturing equipment). In some embodiments, the corrective action is for the same substrate processing equipment that is associated with the trace data (e.g., sensors coupled to the substrate processing equipment provide the trace data). In some embodiments, the corrective action is for one or more sets of substrate processing equipment that are different from the substrate processing equipment associated with the trace data. In some embodiments, to cause the performance of the corrective action based on the fingerprint, the processing device stores the fingerprint in a fingerprint database.

Aspects of the present disclosure provide technical advantages over conventional approaches. Determining of fingerprints based on features of trace data allows performance of corrective actions to have better substrate production compared to conventional solutions of manually associating sensor data with anomalies. Determining of fingerprints that are data agnostic allows fingerprints to be shared among facilities reduce repetition of conventional solutions. This allows the present disclosure to use less energy, time, and material to improve substrate production. In this way, fingerprints associated with corrective actions can be shared or made public without danger of sharing trade secrets, violating intellectual property (IP) confidentiality standards, or sharing private data values. Any entity contributing to a fingerprint database of fingerprints that are data agnostic can choose how much information and what types of information can be stored and accessed. Validating that fingerprints conform to specified fingerprint dimensions before storing them in a the fingerprint database or indicating which dimensions a fingerprint is compliant with when storing them in the database may guarantee a level of agnostics of the fingerprint that might be used to preserve a level of confidentiality, e.g., trade secrets, etc. Knowledge linking fingerprints based on features (e.g., trace data patterns) to corrective actions can then be preserved and transferred safely, saving time, energy, and materials used by conventional solutions to re-learn such associations.

Some embodiments of the present disclosure are described in relation to substrate processing. In some embodiments, the present disclosure applies to other types of manufacturing processes. Many manufacturing processes may benefit from aspects of the present disclosure.

Aspects of the present disclosure enable a method including receiving one or more fingerprint dimensions to be used to generate a fingerprint. The method further includes receiving trace data associated with a manufacturing process. The method further includes applying the one or more fingerprint dimensions to the trace data to generate at least one feature. The method further includes generating the fingerprint based on the at least one feature. The method further includes causing, based on the fingerprint, performance of a corrective action associated with one or more manufacturing processes.

Aspects of the present disclosure enable a non-transitory computer-readable storage medium storing instructions which, when executed, cause a processing device to perform operations including receiving one or more fingerprint dimensions to be used to generate a fingerprint. The operations further include receiving trace data associated with a manufacturing process. The operations further include applying the one or more fingerprint dimensions to the trace data to generate at least one feature. The operations further include generating the fingerprint based on the at least one feature. The operations further include causing, based on the fingerprint, performance of a corrective actions associated with one or more manufacturing processes.

Aspects of the present disclosure enable a system including memory and a processing device. The processing device is configured to receive one or more fingerprint dimensions to be used to generate a fingerprint. The processing device is further configured to receive trace data associated with a manufacturing process. The processing device is further configured to apply the one or more fingerprint dimensions to the trace data to generate at least one feature. The processing device is further configured to generate the fingerprint based on the at least one feature. The processing device is further configured to cause, based on the fingerprint, performance of a corrective action associated with one or more manufacturing processes.

FIG. 1 is a block diagram illustrating an exemplary system 100 (exemplary system architecture), according to certain embodiments. System 100 includes a client device 120, manufacturing equipment 124 (e.g., substrate processing equipment), sensors 126, metrology equipment 128, a predictive server 112, a data store 140, and a fingerprint database 160. The predictive server 112 may be part of a predictive system 110. The predictive system 110 may further include server machines 170 and 180.

In some embodiments, the manufacturing equipment 124 (e.g., cluster tool) is part of a substrate processing system (e.g., integrated processing system). The manufacturing equipment 124 includes one or more of a controller, an enclosure system (e.g., substrate carrier, front opening unified pod (FOUP), autoteach FOUP, process kit enclosure system, substrate enclosure system, cassette, etc.), a side storage pod (SSP), an aligner device (e.g., aligner chamber), a factory interface (e.g., equipment front end module (EFEM)), a load lock, a transfer chamber, one or more processing chambers, a robot arm (e.g., disposed in the transfer chamber, disposed in the front interface, etc.), and/or the like. The enclosure system, SSP, and load lock mount to the factory interface and a robot arm disposed in the factory interface is to transfer content (e.g., substrates, process kit rings, carriers, validation wafer, etc.) between the enclosure system, SSP, load lock, and factory interface. The aligner device is disposed in the factory interface to align the content. The load lock and the processing chambers mount to the transfer chamber and a robot arm disposed in the transfer chamber is to transfer content (e.g., substrates, process kit rings, carriers, validation wafer, etc.) between the load lock, the processing chambers, and the transfer chamber. In some embodiments, the manufacturing equipment 124 includes components of substrate processing systems. In some embodiments, the manufacturing equipment 124 is used to produce one or more products (e.g., substrates, semiconductors, wafers, etc.). In some embodiments, the manufacturing equipment 124 is used to produce one or more components to be used in substrate processing systems. In some embodiments, the manufacturing equipment 124 is used to produce and/or includes a bonded metal plate structure (e.g., showerhead to be used in a processing chamber of a substrate processing system).

Sensors 126 may be coupled to the manufacturing equipment 124. The sensors 126 may provide sensor data associated with manufacturing equipment 124 (e.g., associated with producing, by manufacturing equipment 124, corresponding products, such as substrates). The sensor data may be stored as measurements as a function of time (e.g., trace data 142). Trace data 142 may include historical trace data 144 and current trace data 146. Trace data 142 may be used for equipment health and/or product health (e.g., product quality). The manufacturing equipment 124 may produce products following a recipe or performing runs over a period of time. In some embodiments, the trace data 142 may include values of one or more of temperature (e.g., heater temperature), spacing (SP), pressure, High Frequency Radio Frequency (HFRF), voltage of Electrostatic Chuck (ESC), electrical current, flow, power, voltage, etc. Trace data 142 may be associated with or indicative of manufacturing parameters 156 such as hardware parameters (e.g., settings or components (e.g., size, type, etc.) of the manufacturing equipment 124 or process parameters of the manufacturing equipment 124. Data associated with some hardware parameters may, instead or additionally, be stored as manufacturing parameters 156. Manufacturing parameters 156 may be indicative of input settings to the manufacturing device (e.g., heater power, gas flow, etc.). The trace data 142 and/or manufacturing parameters 156 may be provided while the manufacturing equipment 124 is performing manufacturing processes (e.g., equipment readings when processing products). The trace data 142 may be different for each product (e.g., each substrate).

Metrology equipment 128 may be used to measure properties of finished products such as substrates. Metrology data may be included in performance data 150, along with other performance metrics such as equipment maintenance, yield, etc. Performance data 150 may include historical performance data 152 and current performance data 154.

In some embodiments, trace data 142, performance data 150, or manufacturing parameters 156 may be processed (e.g., by the client device 120 and/or by the predictive server 112). Processing of the trace data 142 may include generating features 166. In some embodiments, the features 166 are a pattern in the trace data 142 or performance data 150 (e.g., slope, width, height, peak, etc.) or a combination of values from the trace data 142 or performance data 150 (e.g., power derived from voltage and current, etc.). The trace data 142 may include features 166 and the features 166 may be used by the predictive component 114 and/or client device 120 for generating fingerprints, 162, performing signal processing, and/or for obtaining predictive data 168 for performance of a corrective action.

Each instance (e.g., set) of trace data 142 may correspond to a product (e.g., a substrate), a set of manufacturing equipment 124, a type of substrate produced by manufacturing equipment 124, or the like. Each instance of performance data 150 or manufacturing parameters 156 may likewise correspond to a product, a set of manufacturing equipment, a type of substrate produced by manufacturing equipment, or the like. The data store 140 may further store information associating sets of different data types, e.g. information indicative that a set of trace data, sensor data, a set of metrology data, and/or a set of manufacturing parameters are all associated with the same product, manufacturing equipment, type of substrate, etc.

In some embodiments, predictive system 110 may generate predictive data 168 using supervised machine learning (e.g., supervised data set, predictive data 168 includes metrology data, etc.). In some embodiments, the predictive system 110 may generate predictive data 168 using semi-supervised learning (e.g., semi-supervised data set, predictive data 168 is a predictive percentage, etc.). In some embodiments, the predictive system 110 may generate predictive data 168 using unsupervised machine learning (e.g., unsupervised data set, clustering, clustering based on performance data 150, etc.). In some embodiments, predictive system 110 may generate predictive data 168 using a model that is one or more of a machine learning model, a statistical model, etc.

The client device 120, manufacturing equipment 124, sensors 126, metrology equipment 128, predictive server 112, data store 140, server machine 170, and server machine 180 may be coupled to each other via a network 130 for generating predictive data 168 to perform corrective actions.

In some embodiments, network 130 is a public network that provides client device 120 with access to the predictive server 112, data store 140, and other publicly available computing devices. In some embodiments, network 130 is a private network that provides client device 120 access to manufacturing equipment 124, sensors 126, metrology equipment 128, data store 140, and other privately available computing devices. Network 130 may include one or more Wide Area Networks (WANs), Local Area Networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, cloud computing networks, and/or a combination thereof.

The client device 120 may include a computing device such as Personal Computers (PCs), laptops, mobile phones, smart phones, tablet computers, netbook computers, network connected televisions ("smart TV"), network-connected media players (e.g., Blu-ray player), a set-top-box, Over-the-Top (OTT) streaming devices, operator boxes, etc. The client device 120 may include a corrective action component 122. Corrective action component 122 may receive user input (e.g., via a Graphical User Interface (GUI) displayed via the client device 120) of an indication associated with manufacturing equipment 124. In some embodiments, the corrective action component 122 transmits the indication to the predictive system 110, receives output (e.g., predictive data 168) from the predictive system 110, determines a corrective action based on the output, and causes the corrective action to be implemented. In some embodiments, the corrective action component 122 obtains trace data 142 (e.g., current trace data 146) associated with the manufacturing equipment 124 (e.g., from data store 140, etc.) and provides the trace data 142 (e.g., current trace data 146) associated with the manufacturing equipment 124 to the predictive system 110. In some embodiments, the corrective action component 122 stores trace data 142 in the data store 140 and the predictive server 112 retrieves the trace data 142 from the data store 140. In some embodiments, the predictive server 112 may store output (e.g., predictive data 168) of the trained machine learning model(s) 190 in the data store 140 and the client device 120 may retrieve the output from the data store 140. In some embodiments, the corrective action component 122 receives an indication of a corrective action from the predictive system 110 and causes the corrective action to be implemented. Each client device 120 may include an operating system that allows users to one or more of generate, view, or edit data (e.g., indication associated with manufacturing equipment 124, corrective actions associated with manufacturing equipment 124, etc.).

In some embodiments, corrective action component 122 causes performance of a corrective action by storing a fingerprint 162 in fingerprint database 160. In some embodiments, fingerprints 162 include one or more of features 166 of trace data 142, context data (e.g., recipe operation, associated manufacturing components), and/or logic (e.g., preventative maintenance, predicted performance, etc.). Corrective action component 122 of client device 120 may facilitate generation of the fingerprints 162, for example by providing trace data 142 to predictive system 110, and associating features 166 with predictive data 168 received from predictive system 110. In some embodiments, before storing a fingerprint 162 in fingerprint database 160, corrective action component 122 may validate that the fingerprint 162 meets standards of confidentiality. In some embodiments, confidentiality standards define that fingerprint 162 is data agnostic, indicating that data values (e.g., sensor readings) cannot be inferred from fingerprint 162. In some embodiments, confidentiality standards calls for fingerprint 162 to be intellectual property (IP) agnostic, indicating that no information that an entity associated with the trace data 142 considers confidential can be inferred from fingerprint 162. In some embodiments, fingerprint dimensions are developed to screen out data that may be extracted from trace data that does not conform to data agnostic or IP agnostic standards, or used to validate that fingerprints developed do conform to data agnostic or IP agnostic standards. In some embodiments, a fingerprint may include data corresponding to one or more dimensions that meet these standards.

Corrective action component 122 may also verify that the fingerprint 162 is a predictor of at least one corrective action. In some embodiments, fingerprint database 160 may store developed fingerprint dimensions. Fingerprint database 160 may also store data indicating a level of IP agnostics achieved by various fingerprint dimensions.

In some embodiments, fingerprints may be generated by applying one or more fingerprint dimensions (e.g., patterns or instructions for processing trace data to generate features) that have been validated and verified for use with the trace data. In some embodiments, a fingerprint dimension includes a respective set of instructions related to a change in trace data (e.g., the beginning of some shape in trace data, a difference between trace data and previous trace data associated with the same manufacturing operation, etc.). Applying fingerprint dimensions to trace data may include executing the instructions on the trace data. In some embodiments, fingerprint dimensions may include instructions to identify a portion of the trace data (e.g., a portion where trace data values change, a portion of unexpected values, etc.). In some embodiments, a feature of trace data may be extracted according to instructions associated with a fingerprint dimension. In some embodiments, the feature may be associated with the portion of trace data wherein a change in trace data was detected (e.g., a shape in trace data, a drift over time, etc.). A more detailed description of validation and verification of fingerprint data can be found with respect to FIGS. 6-7.

In some embodiments, the historical performance data 152 corresponds to historical property data of products (e.g., produced using manufacturing parameters associated with historical trace data 144 and stored manufacturing parameters 156) and predictive data 168 is associated with predicted property data (e.g., of products to be produced or that have been produced in conditions recorded by current trace data 146 and/or manufacturing parameters 156). In some embodiments, predictive data 168 is predicted metrology data (e.g., virtual metrology data) of the products to be produced or that have been produced according to conditions recorded as current trace data 146 and/or manufacturing parameters 156. In some embodiments, predictive data 168 is an indication of abnormalities (e.g., abnormal products, abnormal components, abnormal manufacturing equipment 124, abnormal energy usage, etc.) and one or more causes of the abnormalities. In some embodiments, the predictive data 168 is an indication of change over time or drift in some component of manufacturing equipment 124, sensors 126, metrology equipment 128, or the like. In some embodiments, predictive data 168 is an indication of an end of life of a component of manufacturing equipment 124, sensors 126, metrology equipment 128, or the like.

Performing manufacturing processes that result in defective products can be costly in time, energy, products, components, manufacturing equipment 124, the cost of identifying the defects and discarding the defective product, etc. By generating fingerprints 162 (e.g., predictive data 168) based on features 166 of trace data 142 (e.g., manufacturing parameters that are being used or are to be used to manufacture a product) and causing performance of a corrective action based on the fingerprints 162, system 100 can have the technical advantage of avoiding the cost of producing, identifying, and discarding defective products.

Successfully correlating patterns (e.g., features 166) in trace data 142 and aspects of performance data 150 can be an expensive process. The problems recited above associated with producing and discarding defective products are compounded by the time, energy, materials, personnel, etc. to find and correct the causes of sub-optimal performance. These problems can be alleviated by storing fingerprints 162 indicative of features 166 (features may conform to developed fingerprint dimensions) of trace data 142 and corrective actions associated with those features 166.

Performing manufacturing processes that result in failure of the components of the manufacturing equipment 124 can be costly in downtime, damage to products, damage to equipment, express ordering replacement components, etc. By generating fingerprints 162 (e.g., including predictive data 168) based on features 166 of trace data 142 (e.g., manufacturing parameters that are being used or are to be used to manufacture a product) and causing performance of a corrective action (e.g., predicted operational maintenance, such as replacement, processing, cleaning, etc. of components) based on the fingerprints 162, system 100 can have the technical advantage of avoiding the cost of one or more of unexpected component failure, unscheduled downtime, productivity loss, unexpected equipment failure, product scrap, or the like. Monitoring the performance over time of components, e.g. manufacturing equipment 124, sensors 126, metrology equipment 128, and the like, may provide indications of degrading components.

Manufacturing parameters may be suboptimal for producing products which may have costly results of increased resource (e.g., energy, coolant, gases, etc.) consumption, increased amount of time to produce the products, increased component failure, increased amounts of defective products, etc. By generating fingerprints 162 (e.g., predictive data 168) based on features 166 of trace data 142 and causing, based on the fingerprints 162, performance of corrective actions of updating manufacturing parameters (e.g., setting optimal manufacturing parameters), system 100 can have the technical advantage of using optimal manufacturing parameters (e.g., hardware parameters, process parameters, optimal design) to avoid costly results of suboptimal manufacturing parameters.

Corrective action may be associated with one or more of Computational Process Control (CPC), Statistical Process Control (SPC) (e.g., SPC on electronic components to determine process in control, SPC to predict useful lifespan of components, SPC to compare to a graph of 3-sigma, etc.), Advanced Process Control (APC), model-based process control, preventative operative maintenance, design optimization, updating of manufacturing parameters or updating manufacturing recipes for current or future manufacturing processes, feedback control, machine learning modification, or the like.

In some embodiments, the corrective action includes providing an alert (e.g., an alarm to stop or not perform the manufacturing process if the predictive data 168 indicates a predicted abnormality, such as an abnormality of the product, a component, or manufacturing equipment 124). In some embodiments, the corrective action includes scheduling preventative maintenance. In some embodiments, the corrective action includes scheduling corrective maintenance. In some embodiments, the corrective action includes updating a process recipe to produce subsequent substrates. In some embodiments, the corrective action may be determined in view of an ongoing substrate processing process, and may include updating a current process. In some embodiments, the corrective action includes correcting chamber drift associated with the manufacturing equipment 124 (e.g., substrate processing equipment). In some embodiments, the corrective action includes correcting sensor drift of sensors associated with the manufacturing equipment 124 (e.g., substrate processing equipment). In some embodiments, the corrective action includes providing feedback control (e.g., modifying a manufacturing parameter responsive to the predictive data 168 indicating a predicted abnormality). In some embodiments, the corrective action includes providing machine learning (e.g., modifying one or more manufacturing parameters based on the predictive data 168). In some embodiments, performance of the corrective action includes causing updates to one or more manufacturing parameters. In some embodiments, one or more corrective actions are to be performed in association with components of the substrate processing equipment.

Manufacturing parameters may include hardware parameters (e.g., replacing components, using certain components, replacing a processing chip, updating firmware, etc.) and/or process parameters (e.g., temperature, pressure, flow, rate, electrical current, voltage, gas flow, lift speed, etc.). In some embodiments, the corrective action includes causing preventative operative maintenance (e.g., replace, process, clean, etc. components of the manufacturing equipment 124). In some embodiments, the corrective action includes causing design optimization (e.g., updating manufacturing parameters, manufacturing processes, manufacturing equipment 124, etc. for an optimized product). In some embodiments, the corrective action includes a updating a recipe (e.g., manufacturing equipment 124 to be in an idle mode, a sleep mode, a warm-up mode, etc.).

The predictive server 112, server machine 170, and server machine 180 may each include one or more computing devices such as a rackmount server, a router computer, a server computer, a personal computer, a mainframe computer, a laptop computer, a tablet computer, a desktop computer, Graphics Processing Unit (GPU), accelerator Application-Specific Integrated Circuit (ASIC) (e.g., Tensor Processing Unit (TPU)), etc.

The predictive server 112 may include a predictive component 114. In some embodiments, the predictive component 114 may receive current trace data 146, and/or manufacturing parameters 156 (e.g., receive from the client device 120, retrieve from the data store 140) and generate output (e.g., predictive data 168) for performing corrective action associated with the manufacturing equipment 124 based on the current data. In some embodiments, predictive component 114 may use one or more trained models 190 to determine the output for performing the corrective action based on current data.

In some embodiments, model 190 may be used to generate a data agnostic (or IP agnostic) fingerprint. Model 190 may be a single model, or many models. The models may be applied sequentially, multiple models may be used simultaneously, the appropriate model may be chosen based on some metric, a combination of these approaches may be used, or the like. Model 190 (or the models included in model 190) may be a machine learning model, including supervised, unsupervised, or semi-supervised machine learning model. Model 190 may not be a machine learning model, for example a statistical model, correlation model, etc.

In some embodiments, trace data 142 is supplied to model (or models) 190. Model 190 may be used to extract features 166 from trace data 142. There may be several models selectable to perform feature extraction. For instance, certain recipes, recipe operations, substrate types, manufacturing equipment, etc. may be better analyzed by one type of feature extraction than another. If a subject matter expert (SME) is available, feature extraction may be guided by the SME. Feature extraction may include describing shapes and patterns in trace data 142. Features 166 may include statistics related to trace data, such as counting the occurrence of certain patterns or measuring how patterns change over time (e.g., recipe operation to later recipe operation or from substrate manufacturing process to later substrate manufacturing process). The model chosen to perform feature extraction may be chosen to conform with data agnostic standards, IP agnostic standards, and/or other standards that may vary from application to application.

In some embodiments, extracted features 166 are further analyzed. Model 190 may be used to associate corrective actions and/or predictive data 168 with features 166. Features 166 are provided to trained model 190 as input. Model 190 provides as output corrective actions and/or predictive data associated with the input features 166. Model 190 may include machine learning. Model 190 may be a supervised machine learning model, an unsupervised machine learning model, or a semi-supervised machine learning model. Model 190 may be a model that is not a machine learning model, such as a statistical model. Model 190 may use data gathered from previous instances of trace data and performance data to generate data indicative of a corrective action associated with the features 166.

Generating fingerprints 162 based on one or more features 166 allows corrective actions and/or predictive data associated with patterns in trace data 142 to be maintained, and in a manner that protects against data privacy concerns. Features 166, context data, and performance data 150 can all be customized to conform to standards maintaining privacy of data.

In some embodiments, data input to model 190 may include trace data 142 from a single sensor 126. In other embodiments, data input to model 190 may include trace data 142 from many sensors 126 indicating values of different properties. Data input may include manufacturing parameters 156. The features 166 extracted from the trace data 142, the method of extraction of the features 166, the corrective actions and/or predictive data 168 associated with the features, and the method of associating the corrective actions and/or predictive data 168 may all be tuned for the data provided as input.

In some embodiments, the predictive component 114 receives current trace data 146 and/or manufacturing parameters 156, performs signal processing to break down the current data into sets of current data, provides the sets of current data as input to model 190, and obtains output indicative of predictive data 168 from model 190. In some embodiments, predictive data 168 is indicative of performance data 150 (e.g., metrology data, yield, etc.). In some embodiments, predictive data 168 is indicative of a corrective action.

In some embodiments, model 190 takes as input trace data 142 and data indicative of recipe, manufacturing equipment components, etc. associated with trace data 142 and produces as output a data agnostic fingerprint. Model 190 may be a single model or may include many models. Model 190 may determine, based on input data, which processes to perform, or a user may indicate which analysis are appropriate for the input data, or a combination of these.

Data store 140 and/or fingerprint database 160 may be a memory (e.g., random access memory), a drive (e.g., a hard drive, a flash drive), a database system, or another type of component or device capable of storing data. Data store 140 and/or fingerprint database 160 may include multiple storage components (e.g., multiple drives or multiple databases) that may span multiple computing devices (e.g., multiple server computers). The data store 140 may store trace data 142, manufacturing parameters 156, performance data 150, manufacturing parameters 156, predictive data 168, and features 166. Fingerprint database 160 and/or data store 140 may store fingerprints 162. Trace data 142 may include historical trace data 144 and current trace data 146. Trace data may include sensor data time traces over the duration of manufacturing processes, associations of data with physical sensors, pre-processed data, such as averages and composite data, and data indicative of sensor performance over time (i.e., many manufacturing processes). Manufacturing parameters 156 and performance data 150 may contain similar features. Historical trace data 144, manufacturing parameters 156, and historical performance data 152 may be historical data (e.g., at least a portion for training model 190). Current trace data 146 may be current data (e.g., at least a portion to be input into model 190, subsequent to the historical data) for which predictive data 168 is to be generated (e.g., for performing corrective actions). Features 166 (e.g., feature data) is data related to features of trace data, extracted from trace data 142 by model 190. Features 166 (e.g., feature data) may be stored in data store 140 to be included in data agnostic fingerprints 162.

Fingerprint database 160 may be a memory, drive, database system, or another type of component or device capable of storing data and that is distinct from or part of data store 140. Fingerprint database 160 may too span multiple devices, including the device or devices included in data store 140.

In some embodiments, predictive system 110 further includes server machine 170 and server machine 180. Server machine 170 includes a data set generator 172 that is capable of generating data sets (e.g., a set of data inputs and a set of target outputs) to train, validate, and/or test one or more models, such as machine learning models. Model 190 may include one or more machine learning models, or may be other types of models such as statistical models. Models incorporating machine learning may be trained using input data and in some cases target output data. Models that do not incorporate machine learning may also be trained. In some embodiments, data set generator 172 may partition the historical data (e.g., historical trace data 144, manufacturing parameters 156, or historical performance data 152 stored in data store 140) into a training set (e.g., sixty percent of the historical data), a validating set (e.g., twenty percent of the historical data), and a testing set (e.g., twenty percent of the historical data). In some embodiments, the predictive system 110 (e.g., via predictive component 114) generates multiple sets of elements. For example a first set of elements may correspond to a first set of types of sensor data (e.g., from a first set of sensors, first combination of values from first set of sensors, first patterns in the values from the first set of sensors) that correspond to each of the data sets (e.g., training set, validation set, and testing set) and a second set of elements may correspond to a second set of types of sensor data (e.g., from a second set of sensors different from the first set of sensors, second combination of values different from the first combination, second patterns different from the first patterns) that correspond to each of the data sets.

Server machine 180 includes a training engine 182, a validation engine 184, selection engine 185, and/or a testing engine 186. An engine (e.g., training engine 182, validation engine 184, selection engine 185, and testing engine 186) may refer to hardware (e.g., circuitry, dedicated logic, programmable logic, microcode, processing device, etc.), software (such as instructions run on a processing device, a general purpose computer system, or a dedicated machine), firmware, microcode, or a combination thereof. The training engine 182 may be capable of training machine learning model 190 or various machine learning models included in model 190 using one or more sets of elements associated with the training set from data set generator 172. The training engine 182 may generate multiple trained machine learning models 190, where each trained machine learning model 190 corresponds to a distinct set of elements of the training set (e.g., sensor data from a distinct set of sensors). For example, a first trained machine learning model may have been trained using all elements (e.g., X1-X5), a second trained machine learning model may have been trained using a first subset of elements (e.g., X1, X2, X4), and a third trained machine learning model may have been trained using a second subset of elements (e.g., X1, X3, X4, and X5) that may partially overlap the first subset of elements. Data set generator 172 may receive the output of a trained machine learning model (e.g., a model trained to perform a first operation of trace data processing), collect that data into training, validation, and testing data sets, and use the data sets to train a second machine learning model (e.g., a model to be trained to perform a second operation of trace data processing).

The validation engine 184 may be capable of validating a trained machine learning model 190 using a corresponding set of elements of the validation set from data set generator 172. For example, a first trained machine learning model 190 that was trained using a first set of elements of the training set may be validated using the first set of elements of the validation set. The validation engine 184 may determine an accuracy of each of the trained machine learning models 190 based on the corresponding sets of elements of the validation set. The validation engine 184 may discard trained machine learning models 190 that have an accuracy that does not meet a threshold accuracy. In some embodiments, the selection engine 185 may be capable of selecting one or more trained machine learning models 190 that have an accuracy that meets a threshold accuracy. In some embodiments, the selection engine 185 may be capable of selecting the trained machine learning model 190 that has the highest accuracy of the trained machine learning models 190. In some embodiments, validation engine 184 and selection engine 185 may repeat this process for each machine learning model include in model 190.

The testing engine 186 may be capable of testing a trained machine learning model included in model 190 using a corresponding set of elements of a testing set from data set generator 172. For example, a first trained machine learning model 190 that was trained using a first set of elements of the training set may be tested using the first set of elements of the testing set. Testing engine 186 may determine a trained machine learning model included in model 190 that has the highest accuracy of all of the trained machine learning models based on the testing sets. Testing engine 186 may repeat this process for every machine learning model included in model 190.

Model 190 may refer to the model artifact that is created by the training engine 182 using a training set that includes data inputs and corresponding target outputs (correct answers for respective training inputs). Patterns in the data sets can be found that map the data input to the target output (the correct answer), and the machine learning model is provided mappings that captures these patterns. The machine learning model may use one or more of Support Vector Machine (SVM), Radial Basis Function (RBF), clustering, supervised machine learning, semi-supervised machine learning, unsupervised machine learning, k-Nearest Neighbor algorithm (k-NN), linear regression, random forest, neural network (e.g., artificial neural network), etc. Model 190 may generate a data agnostic fingerprint associated with trace data, and may store the fingerprint in fingerprint database 160.

Predictive component 114 may provide current trace data 146 to model 190 and may run the trained machine learning model 190 on the input to obtain one or more outputs. The predictive component 114 may be capable of determining (e.g., extracting) predictive data 168 from the output of model 190 and may determine (e.g., extract) confidence data from the output that indicates a level of confidence that the predictive data 168 is an accurate predictor of a process associated with the input data for products produced or to be produced using the manufacturing equipment 124 at the current trace data 146 and/or manufacturing parameters 156. The predictive component 114 or corrective action component 122 may use the confidence data to decide whether to cause a corrective action associated with the manufacturing equipment 124 based on predictive data 168.

The confidence data may include or indicate a level of confidence that predictive data 168 is an accurate prediction for products associated with at least a portion of the input data. In one example, the level of confidence is a real number between 0 and 1 inclusive, where 0 indicates no confidence that the predictive data 168 is an accurate prediction for products processed according to input data and 1 indicates absolute confidence that the predictive data 168 accurately predicts properties of products processed according to input data. Responsive to the confidence data indicating a level of confidence below a threshold level for a predetermined number of instances (e.g., percentage of instances, frequency of instances, frequency of occurrence, total number of instances, etc.) the predictive component 114 may cause model 190 to be re-trained (e.g., based on current trace data 146, manufacturing parameters 156, current performance data 154, etc.).

For purpose of illustration, rather than limitation, aspects of the disclosure describe the training of one or more machine learning models 190 using historical data (e.g., historical trace data 144, and historical performance data 152) and inputting current data (e.g., current trace data 146) into the one or more trained machine learning models 190 to determine predictive data 168. In other embodiments, a heuristic model or rule-based model is used to determine predictive data 168 (e.g., without using a trained machine learning model). Predictive component 114 may monitor historical trace data 144, manufacturing parameters 156, and historical performance data 152.

In some embodiments, the functions of client device 120, predictive server 112, server machine 170, and server machine 180 may be provided by a fewer number of machines. For example, in some embodiments server machines 170 and 180 may be integrated into a single machine, while in some other embodiments, server machine 170, server machine 180, and predictive server 112 may be integrated into a single machine. In some embodiments, client device 120 and predictive server 112 may be integrated into a single machine.

In general, functions described in one embodiment as being performed by client device 120, predictive server 112, server machine 170, and server machine 180 can also be performed on predictive server 112 in other embodiments, if appropriate. In addition, the functionality attributed to a particular component can be performed by different or multiple components operating together. For example, in some embodiments, the predictive server 112 may determine the corrective action based on the predictive data 168. In another example, client device 120 may determine the predictive data 168 based on output from a trained machine learning model.

In addition, the functions of a particular component can be performed by different or multiple components operating together. One or more of the predictive server 112, server machine 170, or server machine 180 may be accessed as a service provided to other systems or devices through appropriate application programming interfaces (API).

In embodiments, a "user" may be represented as a single individual. However, other embodiments of the disclosure encompass a "user" being an entity controlled by a plurality of users and/or an automated source. For example, a set of individual users federated as a group of administrators may be considered a "user."

Embodiments of the disclosure may be applied to data quality evaluation, feature enhancement, model evaluation, Virtual Metrology (VM), Predictive Maintenance (PdM), limit optimization, or the like.

Figure 2A:
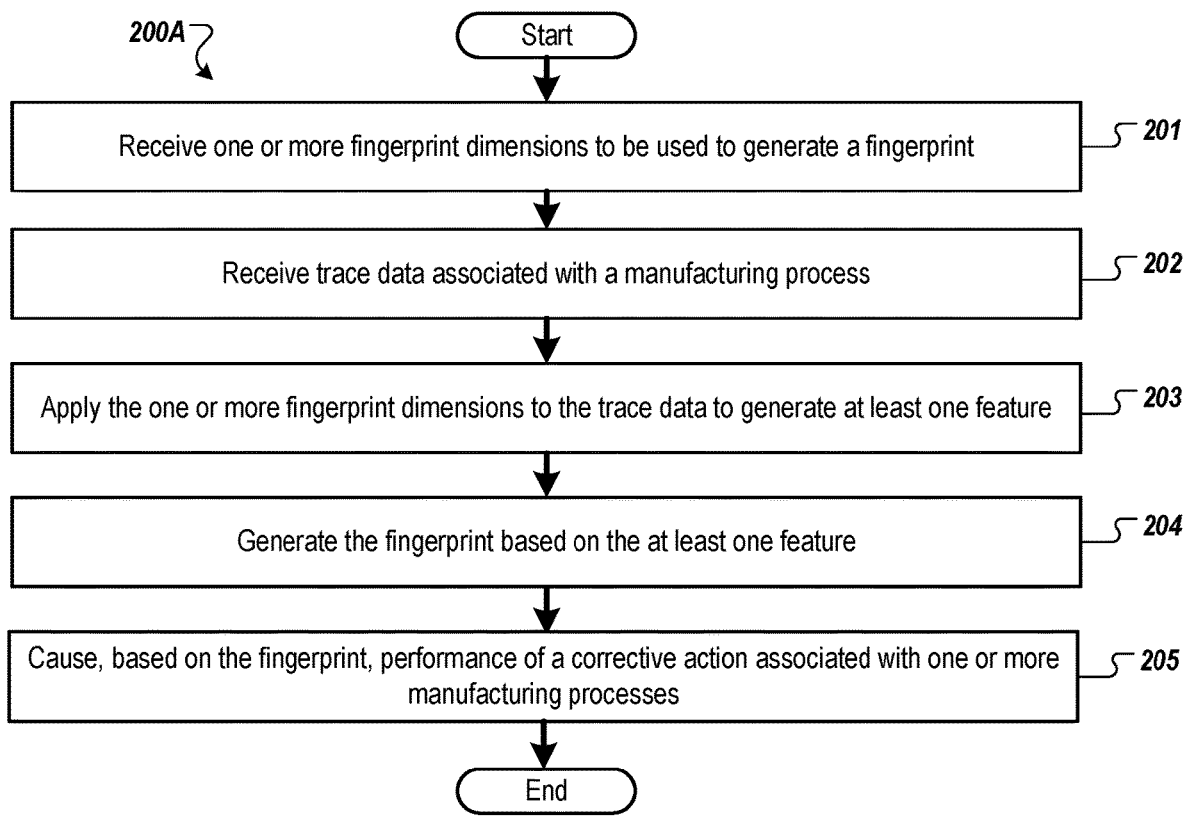
FIGS. 2A-B are flow diagrams of methods associated with generating fingerprints, according to certain embodiments
Figure 2B:
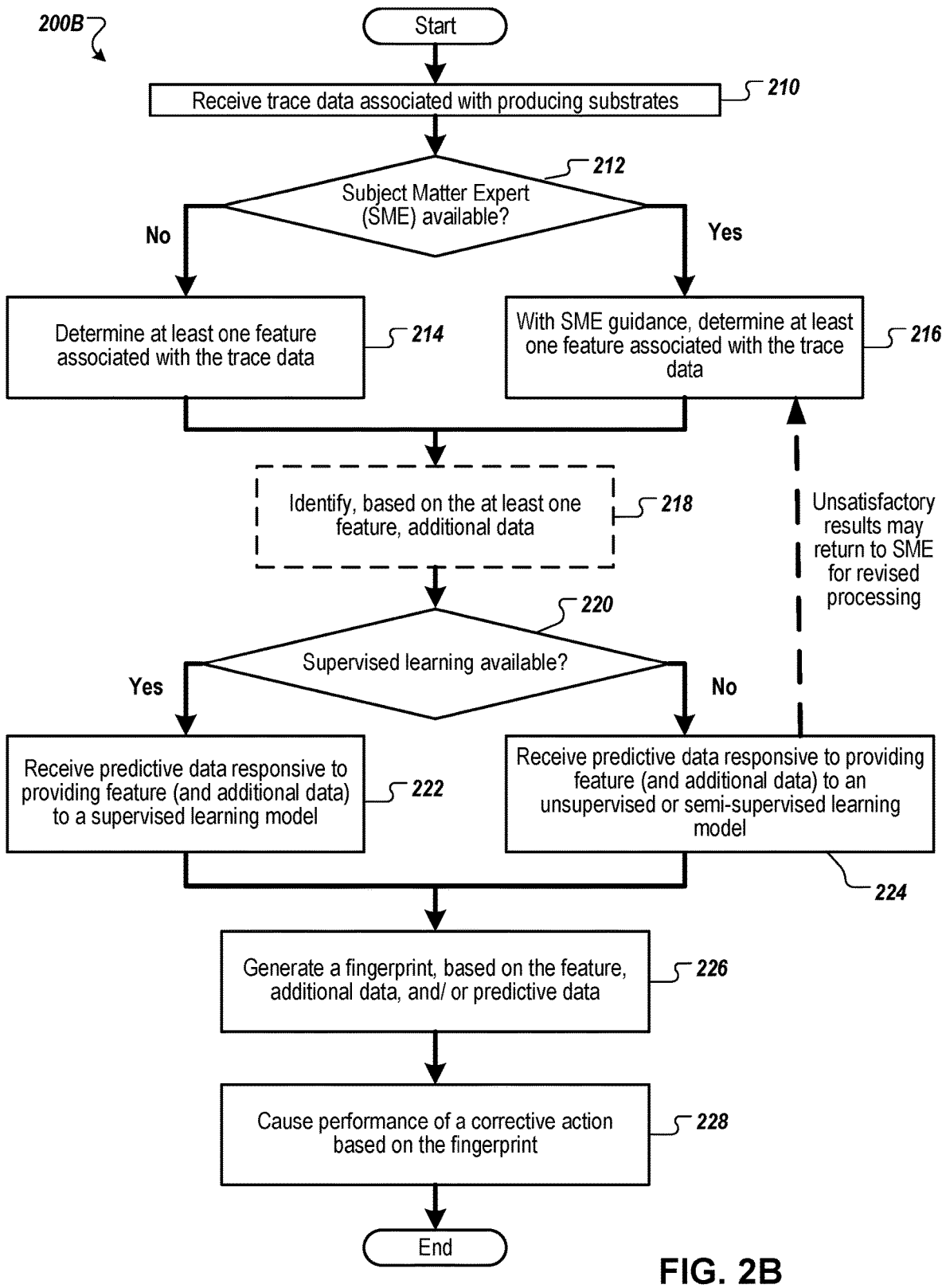

FIGS. 2A-B are flow diagrams of methods 200A-B associated with generating a fingerprint, according to certain embodiments. In some embodiments, methods 200A-B are performed by processing logic that includes hardware (e.g., circuitry, dedicated logic, programmable logic, microcode, processing device, etc.), software (such as instructions run on a processing device, a general purpose computer system, or a dedicated machine), firmware, microcode, or a combination thereof. In some embodiments, methods 200A-B are performed, at least in part, by predictive system 110. In some embodiments, methods 200A-B are performed, at least in part, by one or more of predictive system 110 (e.g., predictive server 112, predictive component 114), client device 120 (e.g., corrective action component), manufacturing equipment 124, and/or metrology equipment 128. In some embodiments, a non-transitory storage medium stores instructions that when executed by a processing device (e.g., of predictive system 110, of server machine 180, of predictive server 112, etc.), cause the processing device to perform one or more of methods 200A-B.

For simplicity of explanation, methods 200A-B are depicted and described as a series of operations. However, operations in accordance with this disclosure can occur in various orders and/or concurrently and with other operations not presented and described herein. Furthermore, in some embodiments, not all illustrated operations are performed to implement methods 200A-B in accordance with the disclosed subject matter. In addition, those skilled in the art will understand and appreciate that methods 200A-B could alternatively be represented as a series of interrelated states via a state diagram or events.

Referring to FIG. 2A, in some embodiments, at block 201, the processing logic receives one or more fingerprint dimensions to be used to generate a first fingerprint. The fingerprint dimensions may be selected because they effectively obscure data values, protect IP, etc. The fingerprint dimensions may include a different selection of dimensions for every trace, every process, every manufacturing facility, etc.

At block 202, the processing logic receives trace data associated with a manufacturing process. The trace data may be sensor data received over time in a substrate processing chamber during a substrate producing process. The trace data may be of one or more types, including temperature, pressure, etc. The trace data may be data from a single sensor, from multiple sensors of the same type, or multiple types of sensors measuring one or several properties. The processing device may also receive data to provide context to the trace data, e.g., data indicating which manufacturing components are associated with the trace data, indications of recipe and recipe operation, indications of substrate type or type of processing, etc. In some embodiments, the data received by the processing logic may include pre-processed trace data.

At block 203, processing logic applies the one or more fingerprint dimensions to the trace data to generate at least one feature associated with the trace data. A generated feature may conform to one or more established dimensions. Generating features that conform to developed, verified, and validated fingerprint dimensions may act as a screen to avoid extracting/storing data that violates data agnostic standards, IP agnostic standards, etc. The at least one feature may be a particular shape in the trace data, such as a period of oscillation, a spike, a ramp, or steady state. The feature may be data describing a shape or shapes in the data, such as a start point and height for a ramp, height and width for a spike, or other descriptions of shapes in the trace data. In some embodiments, data values of the trace data may be absent in the feature data. This can be accomplished by, for example, transitioning the range of data values to an arbitrary scale. The shape in the trace data may also, in some embodiments, not be reflected in the feature. The feature may include statistics of shapes in the trace data, for instance by counting the number of occurrences of a particular feature, or describing a distribution of properties of features (e.g., statistics describing how likely a spike is to be of a certain height). The feature may not be related to a particular shape in the data, but may instead or additionally be a result of performing full trace analysis. Full trace analysis may highlight a series of data points that falls outside a normal range. A normal range may be determined to be a range within a threshold value. The threshold value may be related to manufacturing tolerance, empirical performance data tolerance, predicted performance data tolerance, deviation from an average value for the same recipe operation (e.g., more than two standard deviations from the average), or another metric that can be used to indicate normalcy. Full trace analysis features may include data points, or descriptions of the anomalous data, such as area under the curve, location, height, length, etc., of the highlighted data points. A feature may include existence or parameter correlation between shapes in a trace or group of traces, e.g., if a first feature is present, the likelihood that a second feature is or is not present, or if a first feature is characterized by a particular parameter, the likelihood that a second feature is characterized by a (same or different) parameter. Patterns in trace data that may be features generated by applying one or more fingerprint dimensions (e.g., shape data) may be used to build features according to other fingerprint dimensions (e.g., statistics of occurrences of shapes in trace data). Features may include comparisons between trace data taken over time (e.g., comparing trace data from different production runs of manufacturing equipment, from different processed products, etc.) Features extracted from trace data may be any combination of these or other types of features.

Feature generation of block 203 may involve the use of a model. This may be a trained machine learning model, a statistical model, or another type of model. The processing device may supply the trace data to at least one appropriate model. In some embodiments, the model is executed by the processing device performing operations of method 200A. In some embodiments, the model is executed by a different processing device. The model may contain one or more of:

a statistical model, such as a Gaussian mixture model; a neural model, such as a neural network; or a model designed for anomaly feature extraction, feature persistence analysis, automated partitioning, or the like. The model may automatically identify features through data analysis. The model may be trained to identify features corresponding to certain fingerprint dimensions.

Determining of at least one feature may be accomplished with SME guidance. These features may be of the same types as those discussed above. The feature may be a shape in the trace data, such as a period of oscillation, a spike, a ramp, or steady state. The feature may include data describing the shape in the data, such as start point, height, width, etc. In some embodiments, the trace data cannot be extracted from the feature data. In some embodiments, the shape may not be directly reflected as a feature, but statistics about the presence of shapes may be extracted as features. In some embodiments, the feature may not be related to shapes in the data but may be the result of full trace analysis. Full trace analysis highlights a series of data points that falls outside a normal range. A normal range may be determined to be a range within a threshold value of an expected value, such as a predicted value or an average value. The threshold may be determined in view of manufacturing tolerances, performance tolerances, or statistics (e.g., a number of standard deviations away from an average value), or another metric that indicates normalcy (e.g., meeting a threshold value). Features associated with the trace data may include any combination of these or similar analyses. Feature extraction with SME guidance may use any type of model discussed above. The SME can tune the process of determining features from trace data (e.g., by selecting for particular shapes known to be indicative of corrective actions).

At block 204, processing logic generates a fingerprint (e.g., that is data agnostic, that is value-independent, that is IP agnostic, etc.) based on the one or more features determined at block 203. The fingerprint may include context data indicating, for instance, recipe operation, substrate type, processing conditions, substrate processing equipment components, or the like. The fingerprint may include at least one feature, as determined at block 203. The fingerprint may be generated to include data conforming with one or more fingerprint dimensions (e.g., applying one or more fingerprint dimensions to trace data to generate one or more features), chosen to conform with data agnostic standards, IP agnostic standards, etc. In some embodiments, a fingerprint may be generated and developed fingerprint dimensions used to ensure the generated fingerprint meets confidentiality standards. The fingerprint may include learning indicative of corrective actions and/or predictive data associated with the at least one feature. Fingerprint generation is discussed in more detail in connection with FIG. 2B.

At block 205, processing logic causes, based on the fingerprint, performance of a corrective action. The corrective action may be associated with product production via processing equipment. The processing equipment with which the corrective action is associated may be the same processing equipment or different processing equipment from that associated with the trace data. In some embodiments, the fingerprint and corrective action may be associated with substrate processing equipment, e.g., a substrate manufacturing chamber. The corrective action may include storing the fingerprint in a fingerprint database of fingerprints that are data agnostic. The corrective action may be selected by comparing the fingerprint to other fingerprints stored in the fingerprint database. If at least one feature of the fingerprint matches a feature of a fingerprint stored in the database (e.g., if values of the feature are similar to those of the stored fingerprint to within a threshold), a corrective action stored in the database in association with the stored fingerprint may be executed. The corrective action may include scheduling preventative or corrective maintenance, scheduling component replacement, an update to a recipe operation, correcting for chamber drift (e.g., change in performance over time of some component of substrate processing equipment) or sensor drift, sending an alert to a user, etc.

Storing the fingerprint in a fingerprint database may be responsive to the fingerprint being verified (e.g., verifying the fingerprint conforms to standards of confidentiality, such as being data agnostic and/or IP agnostic, in some embodiments including ensuring that the fingerprint includes data conforming to a selection of fingerprint dimensions) and validated (e.g., determine the predictive data associated with the performance of a corrective action based on the fingerprint meets threshold performance data). Maintaining a database of fingerprints may preserve and make usable associations between features in trace data and appropriate corrective actions (or lack of corrective actions, for example if a feature is found to not be problematic for the manufacturing process). Fingerprints may be generated from future manufacturing processes, and features of the fingerprints compared to those stored in the database. Corrective actions associated with the stored fingerprints may be applied to manufacturing equipment associated with the newly generated fingerprint, if features of the fingerprints are found to match (e.g., have similar values to within a threshold). In some embodiments, fingerprints that share context characteristics may be compared (e.g., the generated fingerprint and the fingerprint stored in the fingerprint database are based on pressure sensor trace data from a chemical deposition manufacturing operation).

In some embodiments, a fingerprint database may be organized in a hierarchical categorization. Each category of fingerprint may be associated with metadata that applies to fingerprints in that category. Categories may be connected and share metadata between them, e.g. a subcategory may inherit metadata from a parent category. In some embodiments, a generated fingerprint may be compared to a fingerprint in a separate, but related, hierarchical category to determine a corrective action. Hierarchical categorization of fingerprints is discussed in more detail in connection with FIG. 5.

FIG. 2B is a flow diagram of a method 200B associated with generating a fingerprint, according to some embodiments. Method 200B may be performed by a computer model or set of computer models (e.g., model 190 of FIG. 1), with or without SME guidance.

At block 210, processing logic receives trace data associated with producing substrates, the substrates produced by substrate processing equipment (e.g., manufacturing equipment 124 of FIG. 1). Block 210 may include similar operations to those described in connection with block 202. The trace data may be sensor data taken over time in a substrate processing chamber during a substrate producing process. The trace data may be of many types, including temperature, pressure, etc. The trace data may be data from a single sensor, from multiple sensors of the same type, or multiple types of sensors. The processing device may also receive data to provide context to the trace data, e.g. data indicating which manufacturing components are associated with the trace data, indications of recipe and recipe operation, indications of substrate type or type of processing, etc.

At block 212, processing logic determines whether SME is available. This determination may be made based on user input of available personnel, IP concerns, information regarding the trace data or context data, or the like.

If no SME is available, method 200B continues to block 214. If SME is available, flow continues to block 216. Operations of block 214 may be similar to some operations discussed in connection with block 204 of FIG. 2A. At block 214, processing logic determines at least one feature associated with the trace data. This feature may be a particular shape in the trace data, such as a period of oscillation, a spike, a ramp, or steady state. The feature may be data describing the shape in the data, such as start point and height for a ramp, or height and width for a spike, or other shape-defining descriptions. In some embodiments, the data values of the trace data may be absent in the feature data. This can be accomplished by, for example, transitioning the range of data values to an arbitrary scale. The shape in the trace data may also, in some embodiments, not be reflected in the feature. The feature may include statistics of shapes in the trace data, for instance by counting the number of a particular feature, or describing a distribution of properties of features (e.g., statistics describing how likely a spike is to be of a certain height). The feature may not be related to a particular shape in the data, but may instead or additionally be a result of performing full trace analysis. Full trace analysis may highlight a series of data points that falls outside a normal range. A normal range may be determined to be a range within a threshold value. The threshold value may be related to manufacturing tolerance, empirical performance data tolerance, predicted performance data tolerance, deviation from an average value for the same recipe operation (e.g., more than two standard deviations from the average), or another metric that can be used to indicate normalcy. Features extracted from trace data may be any combination of these or other types of features. Features may conform to developed fingerprint dimensions (e.g., a fingerprint dimension may be applied to trace data to generate a feature).

Feature extraction of block 214 may involve the use of a model. This may be a trained machine learning model, a statistical model, or another type of model. The processing device may supply the trace data to at least one appropriate model. In some embodiments, the model is executed by the processing device. In some embodiments, the model is executed by a different processing device. The model may contain one or more of a statistical model, such as a Gaussian mixture model; a neural model, such as a neural network; or a model designed for anomaly feature extraction, feature persistence analysis, automated partitioning, or the like. The model may automatically identify features through data analysis.

At block 216, processing logic determines, based on SME guidance, at least one feature associated with the trace data. These features may be of many of the same types as those determined in block 214. Block 216 may include similar operations to those discussed in connection to block 204 of FIG. 2A. The feature may be a shape in the trace data, such as a period of oscillation, a spike, a ramp, or steady state. The feature may include data describing the shape in the data, such as start point, height, width, etc. In some embodiments, the trace data cannot be extracted from the feature data. In some embodiments, the shape may not be directly reflected as a feature, but statistics about the presence of shapes may be extracted as features. In some embodiments, the feature may not be related to shapes in the data but may be the result of full trace analysis. Full trace analysis highlights a series of data points that falls outside a normal range. A normal range may be determined to be a range within a threshold value of an expected value, such as a predicted value or an average value. The threshold may be determined in view of manufacturing tolerances, performance tolerances, or statistics (e.g., a number of standard deviations away from an average value), or another metric that indicates normalcy. Features associated with the trace data may include any combination of these or similar analyses.

Feature extraction at block 216 may involve the use of a model. Any of the models described above in association with feature extraction without SME guidance can also be utilized with SME guidance. The model may contain one or more of a statistical model, a neural model, or a model designed for anomaly feature extraction, feature persistence analysis, automated partitioning, or the like. The SME can tune the process (e.g., by selecting for particular shapes known to be indicative of corrective actions) of feature extraction.

In some embodiments, at block 218, processing logic identifies, based on the at least one feature of block 214 or 216, additional data (e.g., associated with the at least one feature, associated with the trace data, etc.). The additional data may be indicative of the context of the trace data, such as data indicative of manufacturing equipment components, sensor components, recipe operation, processing parameters, and the like. In some embodiments, the additional data may be IP agnostic. In some embodiments the additional data may include the trace data for further processing. In some embodiments, collecting data associated with features to provide to block 220 may be performed by a separate processing device.

At block 220, processing logic determines whether supervised learning is available for the trace data. The determination may be based on the trace data, context data, the at least one feature, user input, and/or the like.

If supervised learning is available, flow continues to block 222. If supervised learning is not available, flow continues to block 224.

At block 222, processing logic provides the at least one feature and any additional data associated with the feature (e.g., including features, statistics of features, augmented trace data, context data, etc.) as input to a supervised machine learning model to receive predictive data (e.g., indicative of a corrective action). The model may be a trained machine learning model. The data may be provided to multiple models to receive multiple outputs. The model may generate predictive data (e.g., indicative of one or more corrective actions) applicable to the manufacturing equipment from which the trace data was generated. The model or models used to generate predictive data may include one or more of a neural network, a deep learning network, clustering analysis, categorical classification analysis (e.g., acceptable, unacceptable), a decision tree, stochastic methods (e.g., a hidden markov model, a recurrent neural network, long short-term memory, etc.), statistical methods (e.g., multilinear regression, partial least squares, support vector machine, etc.), or another model.

If supervised learning is unavailable, block 224 is executed. At block 224, processing logic provides the at least one feature and additional data as input to an unsupervised or semi-supervised learning model and receives predictive data (e.g., indicative of a corrective action). The model may be a trained machine learning model, a statistical model, or the like. The data may be provided to multiple models to produce multiple outputs. The output of the model(s) is indicative of predictive data (e.g., indicative of a corrective action). The corrective action may be associated with substrate processing equipment, which may be the substrate processing equipment associated with the trace data or different substrate processing equipment. A model may perform multivariate techniques or univariate techniques. Analysis may be statistical, such as principle component analysis, or a support vector machine. Analysis may be neural, including neural networks, deep learning, etc. Analysis may be stochastic, such as a hidden Markov process. Any other type of analysis that can connect a corrective action to the feature data may be used. If the results of the analysis to apply learning to the feature data is unsatisfactory (e.g., do not meet a threshold value), the flow may return to block 216. The generation of feature data may be revised, and subsequent operations carried out, until satisfactory results are obtained. In some embodiments, SME guidance may be incorporated at this stage for trace data that was or was not directed to an SME at block 212. In some embodiments, supervised learning may also be unsatisfactory, and returned to an SME for revised processing (not shown).

At block 226, processing logic generates, based on feature, any additional data, and/or the predictive data (e.g., indicative of a corrective action), a fingerprint. The fingerprint may be data agnostic, IP agnostic, value-independent, etc. The operations performed in connection with block 226 may be similar to those described in connection with block 206 of FIG. 2A. The fingerprint may include context data indicating, for instance, recipe operation, substrate type, processing conditions, manufacturing equipment components, or the like. The fingerprint may include at least one feature, determined at blocks 214 and/or 216. The fingerprint may include predictive data (e.g., indicative of a corrective action), generated at blocks 222 and 224. The fingerprint may be based on the feature or features of the trace data. The operations of blocks 218-226 may be similar to block 204-206 of FIG. 2A.

At block 228, processing logic causes, based on the fingerprint, performance of a correction action. The corrective action may be associated with the substrate processing equipment associated with the trace data. The corrective action may be associated with other substrate processing equipment. The corrective action may include storing the fingerprint in a data agnostic fingerprint database. The corrective action may include scheduling preventative or corrective maintenance, scheduling component replacement, an update to a recipe operation, sending an alert to a user, correcting for drift in a component associated with substrate processing equipment, etc.

Storing a fingerprint in a fingerprint database may be responsive to the fingerprint being subject to a verification and validation process. Verification is a method of determining if a fingerprint conforms to confidentiality standards. Each application where fingerprints may be applied may have different confidentiality standards—different processes, operations, facilities, etc. may have different metrics determining what information is to remain private and which information may be public (e.g., available outside the facility). Information associated with trace data deemed safe to share by a controlling entity (e.g., the owner of the trace data) is IP agnostic. The information included in a fingerprint before storing in a fingerprint database may be modified to ensure it is IP agnostic. The information associated with the fingerprint may be modified in a different way depending on the process, facility, controlling entity, etc. in order to maintain IP agnostic status. It may also be determined that the fingerprint is data agnostic. Fingerprint dimensions may be developed such that extracting features conforming to the dimensions can act as a screening process to avoid storing data that violates IP agnostic standards.

Over time, a database of data agnostic and/or IP agnostic fingerprints can be built up. Corrective actions and predictive data may be maintained in a manner that respects various standards of confidentiality associated with trace data used to generate the fingerprints.

Figure 3A:
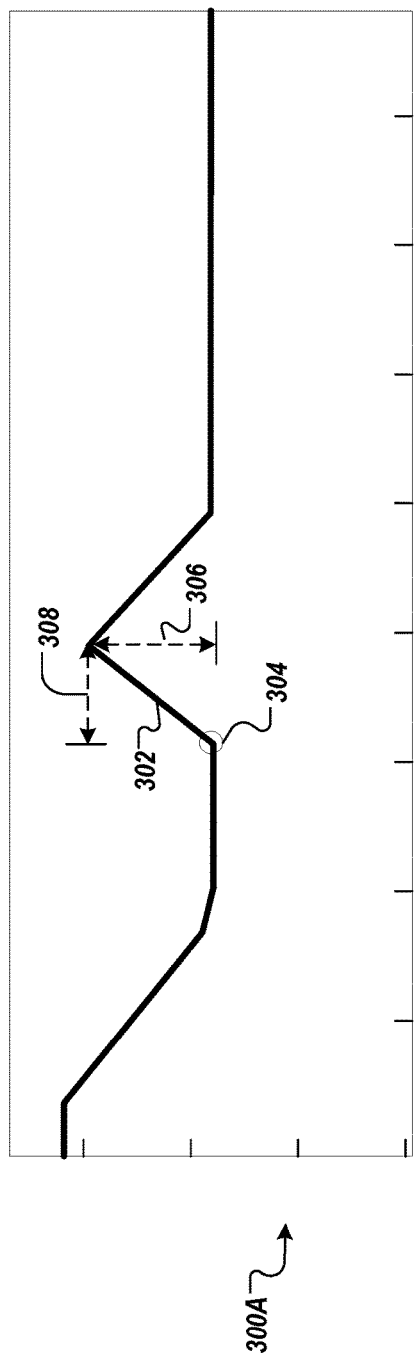
FIGS. 3A-C illustrate features of trace data, according to certain embodiments.
Figure 3C:
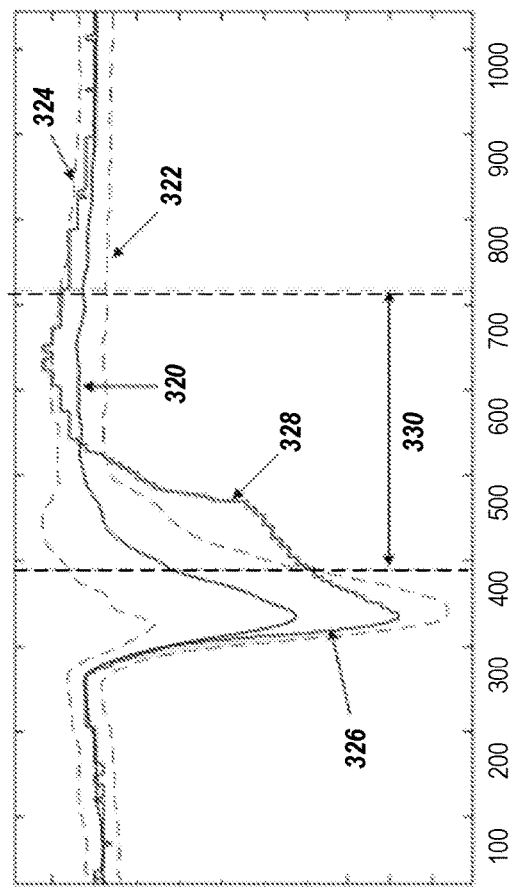
Figure 3B:

FIGS. 3A-C illustrate features of trace data 300 (e.g., shapes in trace data that may be extracted as features), according to certain embodiments. FIG. 3A depicts example trace data 300A. A model used to determine features (such as those utilized at blocks 214 and 216 of FIG. 2B) may recognize slope 302 as a shape to contribute to feature data of trace data 300A. The feature extraction model may extract data related to the shape of slope 302, such as initial value at starting point 304, height of the slope 306, and length of the slope 308.

FIG. 3B depicts an example trace data 300B. Several shapes can be identified in trace data 300B. These features may be automatically detected via a feature extraction model, or SME guidance may be incorporated into feature extraction. Trace 300B includes ramps 310, spike 312, and periods of steady state 314.

In some embodiments, processing logic may determine threshold values indicative of to which type of feature a shape of a segment of trace data belongs, if any, may be determined using SME guidance. The threshold values may instead or additionally be selected in training of a machine learning model.

Each of the shapes depicted in FIG. 3B may have similar information defining the shape extracted as in the case of trace data 300A of FIG. 3A, such as initial value, feature height, feature length, etc. Feature extraction models may be tuned to extract shapes that are known to have physical corollaries. The model(s) may be tuned to extract shapes known to correlate with corrective actions.

As shown in FIG. 3B by the regions of different patterns, feature extraction may be used to determine the boundaries of particular shapes. Current trace data for analysis may be compared to historical trace data associated with previously produced substrates, trace data from other sensors, trace data from other recipe operations, or the like. In some embodiments, a threshold value can be established, and data values higher or lower than that threshold value may be identified as anomalous. In some embodiments, the threshold values may not be a single value (e.g., only identified as anomalous if a feature exceeds a certain duration and a certain value, the value possibly being related to the duration). In some embodiments, the presence of multiple shapes or features in the data taken together may be identified as anomalous, when any alone may not have been. In some embodiments, some features may be identified as anomalous only in combination with other features.

In some embodiments, data describing shapes in the trace data (e.g., start time, height, etc.) may be considered private (e.g., a trade secret). Statistics describing a group of shapes, however, may be considered IP agnostic. Collecting data from many sensors, many substrate production procedures, many recipe operations, or the like may yield statistics describing shapes in the trace data, such as average values related to a shape, binning of values related to shape parameters (e.g., two slopes between heights one and two, four slopes between heights two and three, etc.), or other statistical measures. Variations in statistics from substrate to substrate, manufacturing equipment to manufacturing equipment, recipe operation to recipe operation, sensor to sensor, or the like also provides information that can be associated with corrective actions.

Another approach to extracting features from trace data is performing full-trace data analysis, depicted in FIG. 3C (see trace data 300C of FIG. 3C). Full-trace data analysis can be used in combination with shape-based feature extraction. Full-trace analysis extracts data points outside a normal range, e.g., anomalies in trace data. In full-trace data analysis, a target pattern for a sensor to record over the course of a recipe operation is determined. This may be determined by collecting sensor data associated with multiple substrates processing processes, and choosing a deviation from an average trace 320 at each time point to be the boundary of a normal run (e.g., two standard deviations from the average). Full-trace analysis may use many sets of trace data (e.g., from many manufacturing processes) to build up an average trace 320, a lower limit 322, and an upper limit 324. Series of data points from test trace 326 that are outside the range defined by lower limit 322 and upper limit 324 are included in full-trace analysis feature extraction. The shape of the series of data points outside the range may be described in the feature data. Data points outside the normal range may be flagged as anomalies 328. In some embodiments, extracting features may include defining the region of the trace with full-trace analysis anomalies, violation segment 330. As with the shape extraction, operations may be taken (such as obscuring time values or sensor values, converting full trace analysis data into statistical data, extracting area under the curve or other parameters of anomaly data, etc.) so that the fingerprint (e.g., that is to be created from the features of trace data) is IP agnostic, data agnostic, etc. Full-trace data analysis may be performed by a model. Full-trace data analysis may be guided by an SME.

A set of parameters may define abnormal data points of the trace data in full-trace data analysis. The parameters may include, for example, location of the abnormal data points, area under the curve, duration, frequency (if it occurs multiple times in a trace, multiple times from a particular piece of manufacturing equipment, etc.), time dependency (more likely late or early in the trace data), displacement level, etc. The model used to perform full-trace data analysis may further develop probability distribution functions of these parameters. With SME guidance, parameters may be tuned or adjusted, possibly separately for different types of trace data, different sensors, different manufacturing processes, different shapes of identified series of data points, etc.

Figure 4:
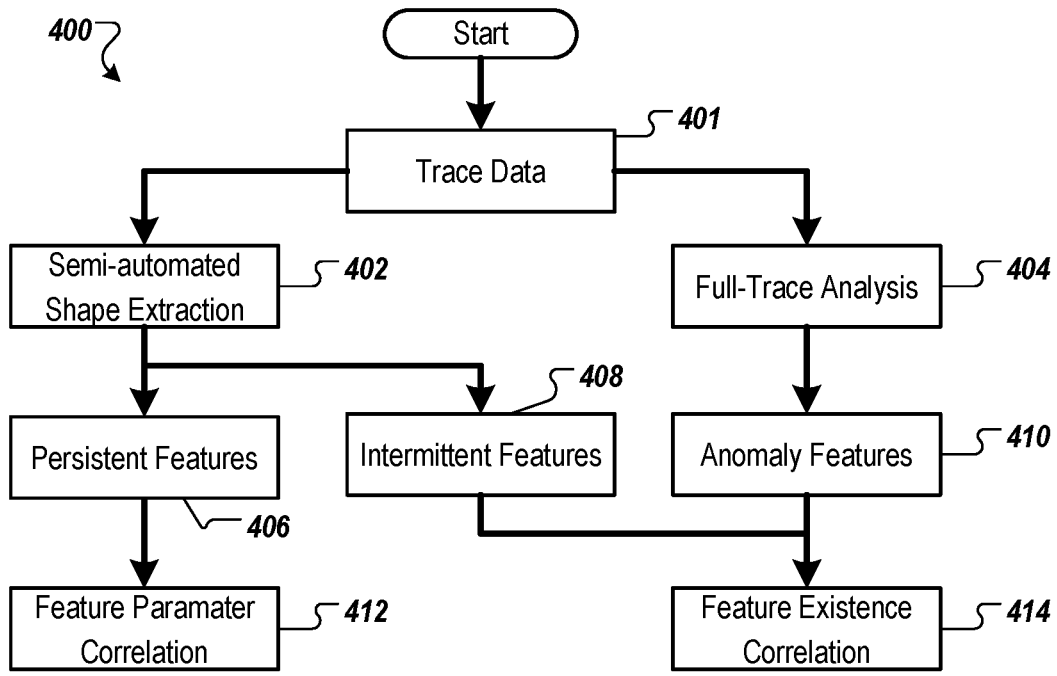
FIG. 4 is a flow diagram associated with analysis of trace data, according to certain embodiments.

FIG. 4 is a flow diagram depicting trace data analysis, according to some embodiments. FIG. 4 depicts a method 400 of generating fingerprints from trace data, relating types of analysis to types of learning. At block 401, a determination is made on what method of data analysis to use to produce a fingerprint from trace data. The determination may be made by a processing device, by a user, or a combination (e.g., a user informed by data from a processing device). At block 402, trace data is analyzed via semi-automated shape extraction, as discussed in detail in conjunction with FIGS. 3A-C. At block 404, trace data is analyzed via full-trace analysis, discussed in detail along with the discussion of FIGS. 3A-C. In some embodiments, trace data may be analyzed both by one or more models performing semi-automated shape extraction, and one or more models performing full-trace analysis.

Semi-automated shape extraction and full-trace analysis produce information describing different types of features. Semi-automated shape extraction produces data indicative of persistent features (block 406), such as features recorded consistently from substrate manufacturing process to substrate manufacturing process, recorded consistently from multiple sensors, multiple components of manufacturing equipment, etc. Semi-automated shape extraction also generates data indicative of intermittent features (block 408). These features may not be represented consistently in different data sets, whether the different sets are related to traces associated with different substrates, different sensors, different recipe operations, etc. Persistent features and intermittent features may be categories that broadly classify features and determine what information may be extracted in view of the features. The same feature may be considered persistent if included in a set of data where correlating parameters of features generates more consistent predictive data, or intermittent if included in a set of data where correlating feature existence generates more consistent predictive data (e.g., a leak in processing equipment may produce a feature that is repeated in every recipe operation and may be considered persistent in the context of that processing run, but compared to trace data collected from other manufacturing equipment that does not have a leak, the feature may be considered intermittent). Full-trace analysis highlights deviations from normal sensor readings, and generates data indicative of anomaly features (e.g., any trace data outside a chosen threshold of normalcy, indicated at block 410). In some embodiments, full-trace analysis may produce persistent features or intermittent features (e.g., in the case that fingerprints are generated from trace data associated with many manufacturing runs). In some embodiments, semi-automated shape extraction may generate data of anomaly features.

At block 412, persistent features may be analyzed by comparing parameters of the persistent features. Statistics of parameters describing the shapes of persistent features may be analyzed, correlation between features and feature parameters may be analyzed (e.g., if spike A is of a certain height, spike B is likely to be nearly the same height), and feature parameters may be analyzed over time (e.g., many manufacturing runs) to determine changes or drift in chamber components, sensors, etc. Correlations may be recorded and stored with generated fingerprints.

At block 414, intermittent and anomaly features may be analyzed by examining conditions and parameters surrounding their existence. Time dependency may be analyzed (e.g., a feature in a trace from one sensor being time-matched or having a delay compared to a feature in a trace from another sensor), along with occurrence dependency (e.g., if a feature appears, another feature may be more or less likely to appear), along with data discussed above associated with features, such as data describing the shape, statistics of shape data, correlations, etc. Such analysis may be recorded and stored with generated fingerprints associated with input trace data.

Figure 5:
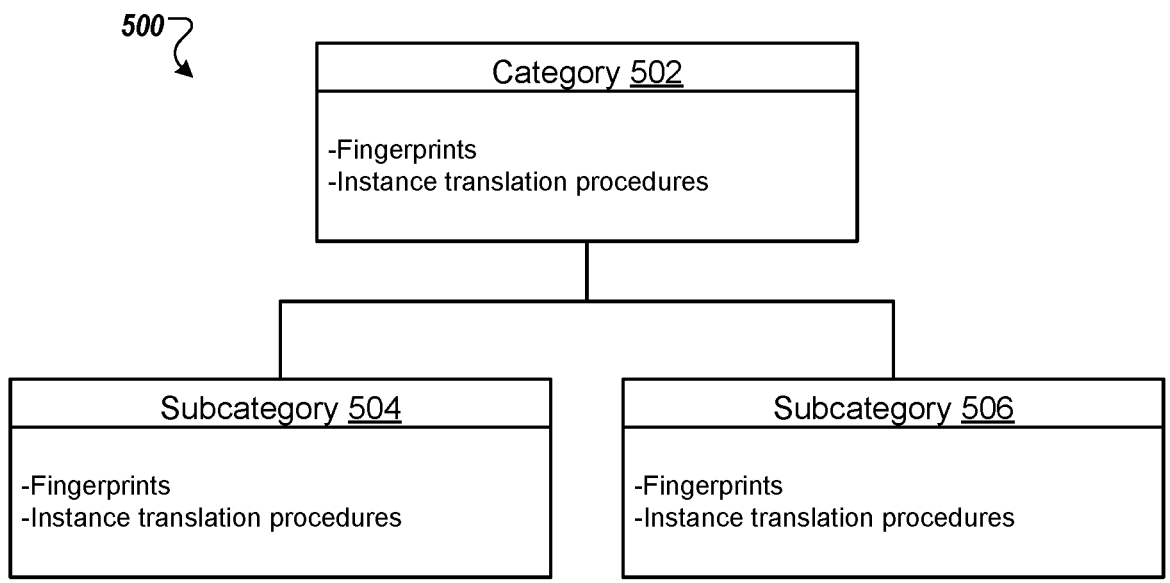
FIG. 5 illustrates hierarchy associated with fingerprints, according to certain embodiments.

FIG. 5 is an example hierarchy 500 for organizing fingerprints, according to some embodiments. Fingerprints stored in a fingerprint database (e.g., fingerprint database 160 of FIG. 1) may be organized in a hierarchical structure. Each fingerprint may belong to a hierarchal category. Information applicable to one category of fingerprint may be inferred to be applicable to another category as well. Hierarchy 500 depicts three categories, a parent category 502, and two subcategories, subcategory 504 and subcategory 506. Each category classifies fingerprints stored in a fingerprint database, and stores information applicable to fingerprints in that category. Whenever a new fingerprint is initiated (instanced), it inherits metadata (e.g., corrective actions, predictive data, etc.) from the category it belongs to. In some embodiments, instance translation procedures store data indicative of metadata associated with other categories (e.g., the parent category) that are also applicable to the initiated fingerprint. When a new fingerprint is instanced in a particular category, the new fingerprint may be updated based on metadata of a second fingerprint belonging to a different hierarchal category with a defined relationship to the category of the new fingerprint. Data indicative of the relationship between categories may be stored in the fingerprint database.

As an example, category 502 may be a type of processing recipe operation, such as deposition. There may be fingerprints belonging to the deposition category. In some embodiments, a fingerprint may be classified as belonging to a less specific category due to IP concerns. In some embodiments, a fingerprint may be classified as belonging to a less specific category if it is found that predictive data associated with the fingerprint is relevant to multiple subcategories. Subcategory 504 and subcategory 506 may correspond to chemical vapor deposition and physical vapor deposition, respectively. When a fingerprint is instanced, and assigned to the physical vapor deposition category, it may inherit metadata from the physical vapor deposition category as well as metadata applicable to any deposition recipe operation (e.g., metadata possibly including corrective actions and/or predictive data from the parent deposition category).

Hierarchy 500 depicts a single parent category 502 and two subcategories, but the fingerprint database may include a web of interlocking categorizations, with category 502 having its own parent category, and subcategory 504 and/or subcategory 506 having subcategories of their own. Additionally, more complex relationships are possible, such as a category inheriting learnings from multiple parent categories (e.g., a chemical deposition operation may inherit learnings from a chemical deposition category, a general deposition category, and a chemical processing category).

A hierarchical organization allows learnings to be connected among somewhat different recipe operations if applicable, and allows learnings to be reused even when IP concerns limit the available information about a particular fingerprint. Hierarchical organization may, in some embodiments, highlight fruitful areas of research. As an example, there may be some metadata (e.g., predictive data) that would be very valuable if the metadata could be applied to fingerprints belonging to a particular category. In some cases, an experiment may be done to confirm that those metadata apply (e.g., a pattern in some types of data that indicates a problem in a certain component of a manufacturing system, performing tests with a known faulty component may connect predictive data). In some embodiments, a processor may search for areas of fruitful research and alert a user.

In some embodiments, a hierarchical categorization may be applied to fingerprint dimensions. In some embodiments, categorization of fingerprint dimensions may enable development of fingerprint dimensions with at least a given level of information agnostics (e.g., data agnostic, IP agnostic). In some embodiments, a fingerprint may be developed that is a subcategory of an established fingerprint dimension category (e.g., uses strictly less data than the parent category). A fingerprint dimension belonging to the subcategory may have (e.g., inherit) at least the level of information agnostics as the parent category. In some embodiments, categorization allows fingerprint dimensions to be managed in a hierarchical structure. In some examples, a first fingerprint dimension has a particular level of data agnostics and is part of a particular class (e.g., hierarchy, category) and a second fingerprint dimension that belongs to the same class is to have the same level of data agnostics. Fingerprint dimensions may not be treated or managed individually. Fingerprint dimensions may be managed in a class structure (e.g., hierarchy, category), for example in the perspective of information agnostics. In some embodiments, fingerprint dimensions components may be managed using a hierarchical structure. For example, a fingerprint dimension may include multiple components. A new fingerprint dimension may be developed which replaces one or more components (e.g., features, statistics, correlations, etc.) with other components. Components belonging to related hierarchical categories may be used to maintain a level of information agnostics in the newly developed fingerprint dimension.

Figure 6:
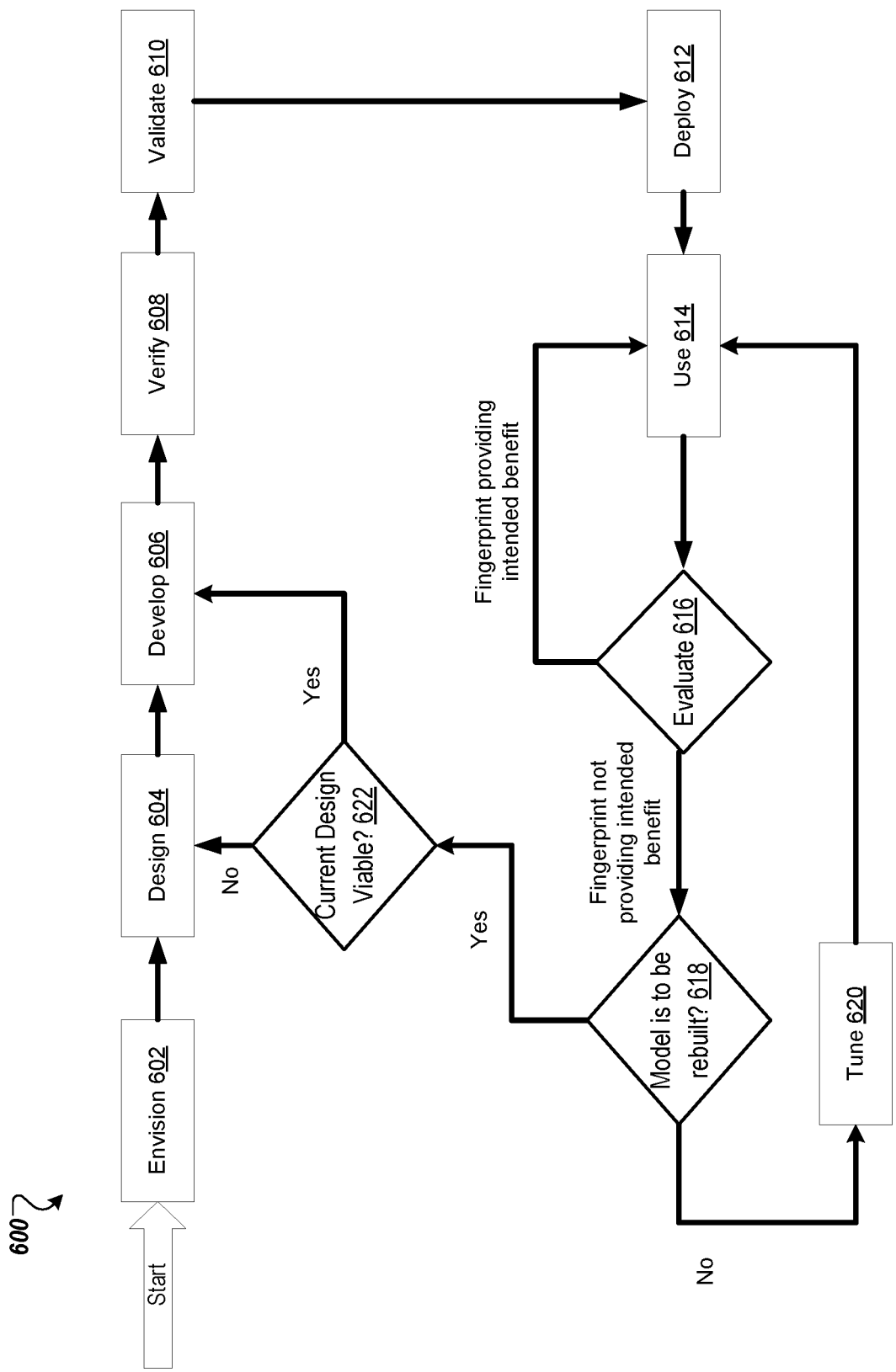
FIG. 6 is a flow diagram associated with verification and validation of a fingerprint, according to certain embodiments.

FIG. 6 is a flow diagram associated with verification and validation of fingerprints according to process 600, according to some embodiments. The interconnected nature of a hierarchically organized fingerprint database (as described above in connection with FIG. 5) can cause errors to propagate through the database, as information associated with corrective actions and/or predictive data are applied to subcategories, related categories, etc. To avoid errors corrupting the fingerprint database, all data added to it may be verified and validated, using a process such as that depicted in FIG. 6. In some embodiments, all fingerprints added to the database are subject to a verification and validation process. In some embodiments, fingerprint dimensions added to the database are subject to verification and validation, e.g., feature parameter correlation or feature existence correlation, as discussed in conjunction with FIG. 4. Many different fingerprints dimensions are possible, including multivariate sensor contribution analysis (e.g., information identifying what sensors are involved in the trace data), shape statistics (such as statistics including mean, median, standard deviation, etc. of occurrences of parameters, including shape start point, shape duration, area under the curve of a shape, height of a shape, etc.), feature persistence (e.g., a distribution of the feature or feature parameters), feature existence correlation (e.g., relationship between a feature and presence or absence of any additional features in the trace), feature parameter correlation (e.g., relationship between a feature's parameters and additional feature parameters), shape tolerance (e.g., warping of a shape), analysis output shape (e.g., regions of data space when features, feature parameters, etc. are plotted or represented over some domain are considered normal, faulty, or undetermined), feature dynamics (e.g., change in a feature over time, during a processing run or over many runs), temporal behavior of a feature, predictive changes in fingerprints associated with taking corrective actions, and the like. Fingerprint dimensions could also include actions to be performed on information, including raw data or processed information, to make the original environment more obscure such as normalization of data, translation of data using a key that is only shared between specified parties, and homomorphic encryption of the information. Fingerprint dimensions used in one context (e.g., a recipe operation, type of substrate, etc.) may not be used in another context, in some embodiments. A fingerprint may include data conforming to a number of fingerprint dimensions. Before adding these or any other types of fingerprints to a fingerprint database, the fingerprint dimension may be subject to verification and validation. In the discussion of verification and validation, processes and operations may be applied to both fingerprints and fingerprint dimensions to be added to the database, unless context makes it clear that only one is relevant. In some embodiments, ensuring features conform to designated fingerprint dimensions may be used to screen out data that may violate data agnostic standards, IP agnostic standards, etc.

Verification includes confirming that a fingerprint (or a new fingerprint dimension) meets design qualifications. Verification may include determining that a fingerprint meets standards of being data agnostic, IP agnostic, or the like. Validation includes confirming that a fingerprint meets the needs of a user. Validation may include determining that the fingerprint has the capability to suggest corrective actions which improve the performance of substrate processing equipment. Validation may include determining that performing a corrective action associated with a fingerprint meets a threshold of improvement of the substrate processing equipment.

At block 602, a new fingerprint or fingerprint dimension is envisioned. This may be the result of SME research, statistical correlations, machine learning-found correlations, or the like. At block 604, the fingerprint is designed. Information about what data belongs in the fingerprint is determined. At block 606, the fingerprint is developed. Specific routes to collect data, which models to use to extract data, which features may be relevant, and the like may all be specified in the development operation of a fingerprint. At blocks 608 and 610, the fingerprint is verified and validated. A more detailed description of verification can be found in connection with FIG. 7 below.

Validation of fingerprint dimensions includes a set of test procedures to determine whether the fingerprint dimension is capable of providing value in the environment in which it will be used. The tests to determine if a fingerprint dimension can provide value would be depending on the application environment. As an example, if a particular fingerprint dimension could determine that an anomaly had occurred, but was unable to identify a particular corrective action, it may not meet the standard of value to be added to the fingerprint database. Tests to validate fingerprint dimensions may have a threshold performance value, which an associated corrective action much meet in order to be verified. Conditions related to the use of the fingerprint dimension, the extensions of learnings to other categories (e.g., in the hierarchical categorization) of fingerprint, testing procedures to further validate the fingerprint dimension, etc. may all be included with the fingerprint dimension when it is added to the fingerprint database.

Validation of fingerprints includes a set of test procedures to determine if the fingerprint of capable of providing value in the environment in which it will be used. Tests may be performed to determine usefulness of a fingerprint (e.g., appropriate associated corrective actions) in validation. The tests performed may be dependent on the application environment with which the proposed fingerprint is to be associated. Tests to validate fingerprints may include a threshold performance data, and validation may occur if predictive performance data (e.g., corrective actions) associated with the fingerprint meet the threshold performance data.

At block 612, the verified and validated fingerprint is deployed to the fingerprint database. At blocks 612-620, the fingerprint is stored in the fingerprint database, and subject to being used to compare to current trace data to search for learnings, for example. Blocks 602-610 and 622 are not executed when the fingerprint is available to be used in the fingerprint database.

At block 614, the fingerprint is used, e.g. the database is queried with current trace data, extracted features of which correspond to those of the fingerprint, and the corrective actions suggested by the fingerprint are taken by the user in association with the substrate processing equipment. At block 616, the result of using the fingerprint is evaluated. The corrective action may have had the intended result on the substrate processing equipment, or it may not have. If it has, the fingerprint remains in the fingerprint database to be used again when another trace matching the scope of the fingerprint is used to query the database. If it has not, the fingerprint is adjusted.

At block 618, a determination is made if the fingerprint is to be rebuilt. This determination may be made utilizing SME guidance. If a determination is made that the fingerprint is useful, but some parameters may be adjusted to increase its utility, the fingerprint is tuned to change those parameters at block 620. The fingerprint is then returned to the database to be used (block 614) and evaluated (block 616) again.

If a determination is made that the fingerprint is unusable, the fingerprint is taken off-line (e.g., can no longer be accessed to provide guidance on corrective actions in the fingerprint database). At block 622, a determination is made on whether the fingerprint will be redesigned or redeveloped (e.g., whether different data is to be included in the fingerprint, whether an updated corrective action is to be associated with the fingerprint, or whether the processing of that data will be adjusted). The redesigned or redeveloped fingerprint is then subject to verification and validation before being deployed into the fingerprint database.

This is one example procedure, and other variations are within the scope of this disclosure. A verification and validation procedure prevents corruption from entering the fingerprint database, and a reevaluation process once a fingerprint is accessed and the learnings utilized allows fingerprints which are associated with corrective actions that improve the operations of substrate processing equipment to remain in the fingerprint database, to be accessed again.

Figure 7:
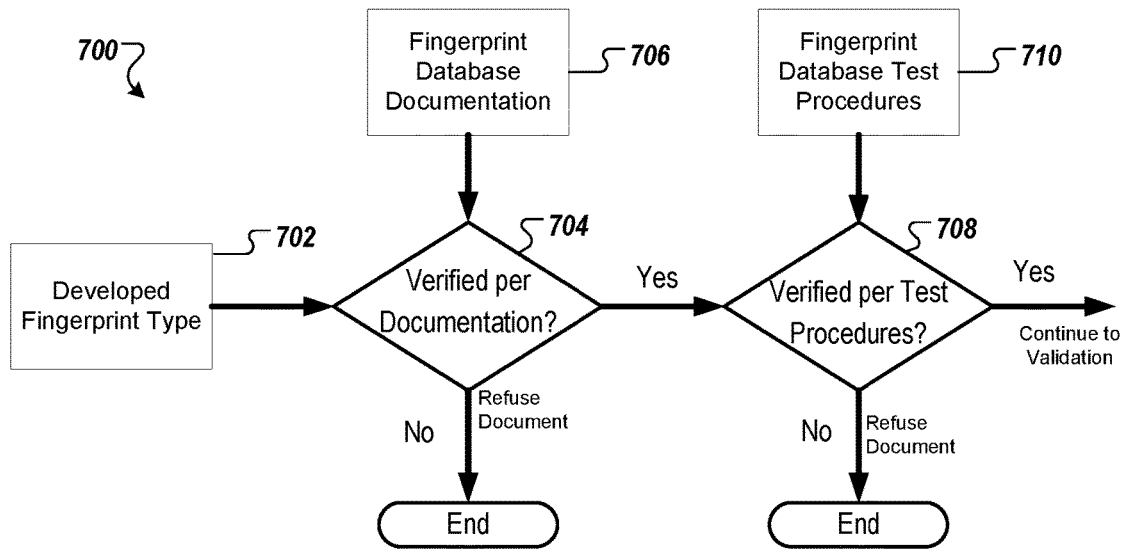
FIG. 7 is a flow diagram of method associated with verifying fingerprints, according to certain embodiments.

FIG. 7 is a flow diagram of method 700 of verifying fingerprint dimensions before deployment in a fingerprint database, according to some embodiments. Method 700 describes verification of fingerprint dimensions; fingerprints may be subject to a corresponding verification procedure. At block 702, a developed fingerprint dimension is to be verified. Development of fingerprints and fingerprint dimensions is discussed in more detail above in connection with FIG. 6. At block 704, a processing device receives the developed fingerprint dimension and documentation related to verification of fingerprints from a memory device (block 706). The developed fingerprint dimension may include data documenting the level to which the fingerprint dimension is data agnostic, IP agnostic, etc. Verifying the fingerprint dimension may include determining a level of information agnostics associated with the fingerprint dimension. The developed fingerprint dimension may include data indicative of a corrective action output quality. The fingerprint database documentation of block 706 may include standards associated with fingerprint dimensions being data agnostic, IP agnostic, corrective action output quality, etc. the processing device compares the documented data associated with the developed fingerprint type to the fingerprint database documentation. If the fingerprint dimension does not meet the standards of the fingerprint database documentation, it is not verified, the result is recorded (e.g., to avoid cost associated with attempting to develop the same fingerprint dimension again), and the verification process ends.

If documented quality data of a fingerprint dimension meets that of the fingerprint database documentation, at block 708 a processing device receives the developed fingerprint dimension and fingerprint database test procedures (block 710). Test procedures are performed by the processing device on the fingerprint dimension, confirming that the fingerprint dimension conforms to standards of being data agnostic, IP agnostic, quality thresholds, and the like. If the fingerprint dimension does not meet the standards when tested, it is not added to the fingerprint database, the result is recorded, and the verification process ends. If the fingerprint dimension does meet the standards of verification when tested, the fingerprint dimension continues to validation as discussed in connection with FIG. 6 above. A fingerprint may be subject to similar verification operations. In verification of a fingerprint, operations of block 704 may include determining that the fingerprint conforms to one or more fingerprint dimensions that may be used in connection with the trace data (e.g., fingerprint dimensions that have been determined to not violate IP concerns associated with the trace data, fingerprint dimensions that have been determined to generate data agnostic features, etc.).

Figure 8A:
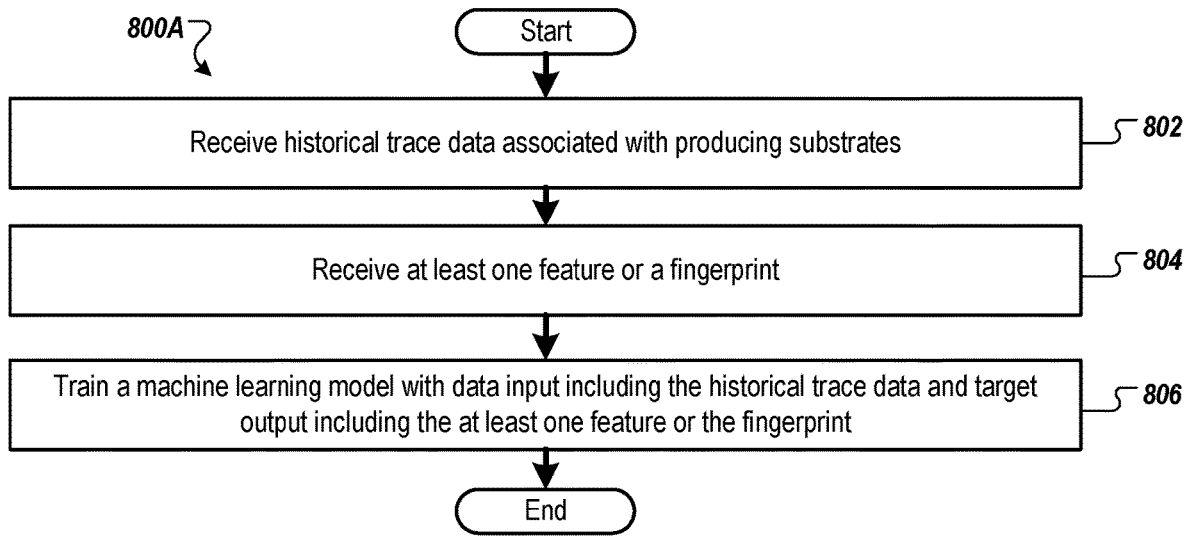
FIGS. 8A-B are flow diagrams depicting methods associated with machine learning models associated with fingerprints, according to certain embodiments.
Figure 8B:
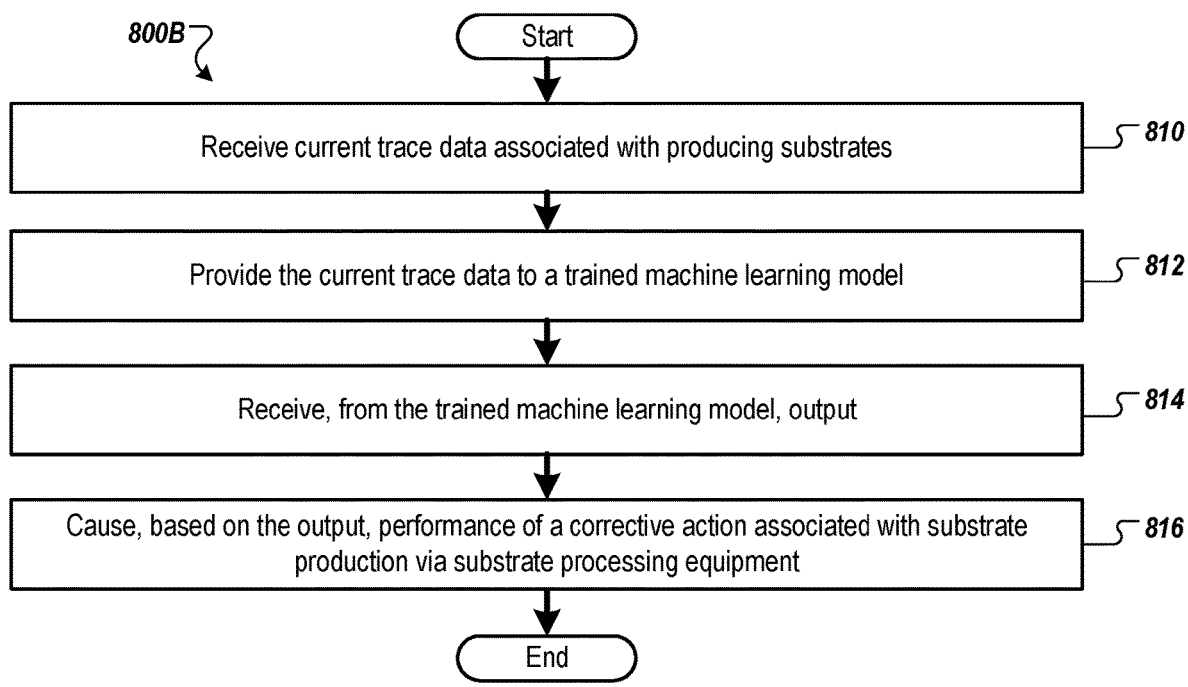

The current disclosure may include many machine learning models, applied at different operations of the methods disclosed herein. FIGS. 8A-B depict methods 800A-B of training and using a machine learning model, according to some embodiments. For the purpose of illustration, a machine learning model taking as input trace data and producing as output features associated with the trace data is used in FIGS. 8A-B to describe working with machine learning models (e.g., a model of block 206 of FIG. 2). Other machine learning models are also used and trained in a similar way to the methods depicted in FIGS. 8A-B.

FIG. 8A depicts a method 800A of training a machine learning model, according to some embodiments.

Different models, combinations of models, ensemble models, etc., are all within the scope of this disclosure. In some embodiments, a machine learning model (or multiple machine learning models) may be configured to receive trace data and generate at least one feature (e.g., actions associated with blocks 214 and 216 of FIG. 2B). In some embodiments, a machine learning model (or multiple models) may be configured to receive at least one feature (and additional data) and generate predictive data (e.g., actions associated with blocks 222 and 224 of FIG. 2B). In some embodiments, a single model, group of models, ensemble model, etc., may receive as input trace data and produce as output predictive data or a fingerprint (e.g., actions associated with blocks 210-228 of FIG. 2B). For conciseness, only a subset of possible machine learning models are discussed in association with FIG. 8A-B. Other models may be associated with similar methods to those discussed in connection with FIG. 8A-B, the input data and output data updated as appropriate for the model.

At block 802 of FIG. 8A, processing logic receives historical trace data associated with producing substrates. The trace data may have been pre-processed by another machine learning model, a model that is not a machine learning model, an SME, etc. Preprocessing may include grouping of data from sensors into elements, combination of feature data (e.g., voltage and current to calculate power), removal of outliers, summary statistics (e.g., mean, median, etc.), etc.

At block 804, processing logic receives at least one feature or a fingerprint (e.g., associated with the historical trace data). The type of data received is responsive to the role the machine learning model is to fill, when trained. The at least one feature may include data indicative of a shape, data outside a normal range, etc., as expressed above, for instance in connection with FIG. 2B.

At block 806, processing logic trains a machine learning model with data input including the historical trace data and target output including the at least one target feature or the target fingerprint. The trained machine learning model may then be used to generate fingerprints for the performance of corrective actions. The model may be trained to generate fingerprints including data (e.g., at least one feature) conforming to one or more fingerprint dimensions. A model may be used that extracts data conforming to many fingerprint dimensions, and some subset of the fingerprint dimensions may be used for particular trace data.

The flow diagram of FIG. 8A describes a method of training a machine learning model to take as input trace data (possibly pre-processed) and produce as output data indicative of features or a fingerprint as an example of some types of machine learning models that are within the scope of this disclosure. Other machine learning models may be used, for instance, machine learning models that take as input features and provide as output corrective actions, machine learning models that receive trace data as input and provide as output predictive data, etc. Such machine learning models may be trained using analogous methods, using different data types as training input and target output as appropriate. Some machine learning models may be used that are not provided target output during trainings (e.g., unsupervised or semi-supervised models). These machine learning models may use a metric other than similarity of output to target output for training.

FIG. 8B is a flow diagram depicting method 800B of using a trained machine learning model, according to some embodiments. As discussed in connection with FIG. 8A, machine learning models applicable to this disclosure are not limited to the variations shown in FIG. 8B.

At block 810, processing logic receives trace data associated with producing substrates. Along with the trace data, the processing logic may receive data indicative of context of the trace data, e.g., recipe operation, manufacturing equipment components, substrate type, etc. The processing device may perform some pre-processing, such as organizing data from sensors into elements, or the like.

At block 812, processing logic provides the trace data to a trained machine learning model. The trained machine learning model is configured to produce data indicative of a fingerprint. In some embodiments, the trained machine learning model provides data agnostic features of the trace data that are further processed to form fingerprints. In some embodiments, the further processing is performed by another machine learning model. In some embodiments, a single machine learning model may take as input trace data and produce as output fingerprints, where the fingerprint includes data indicative of context and data indicative of at least one corrective action associated with substrate processing equipment.

At block 814, processing logic receives, from the trained machine learning model, output. In some embodiments, one processing device may be used to provide trace data to the trained machine learning model, and another processing device may be used to receive the data from the trained machine learning model. In some embodiments, they may be the same processing device.

At block 816, processing logic causes performance of a corrective action in view of the output received from the trained machine learning model. The corrective action may be associated with substrate production via substrate processing equipment. In some embodiments, the output of the trained machine learning model may include features, with further processing to be performed to associate corrective actions with the features. In some embodiments, the output of the trained machine learning model may include data indicative of a corrective action. The corrective action may include sending an alert to a user, scheduling preventative or corrective maintenance, updating a process recipe to produce subsequent substrates, updating a process recipe to correct the processing of a substrate currently being processed, correcting chamber drift associated with substrate processing equipment or sensors, or the like.

As discussed in connection with FIG. 8, method 800B is provided as an example of using one type of machine learning model associated with this disclosure. Machine learning models may be utilized for other parts of this disclosure. Machine learning models may perform distinct functions from those described in FIG. 8B, may perform functions that include some or all of those described in FIG. 8B, or may perform just a part of the functions described in FIG. 8B. Various processing devices housed on various machines (e.g., client device 120, server machine 170, server machine 180, or predictive server 112 of FIG. 1) may actually perform some or all of methods 800A-B.

Figure 9:
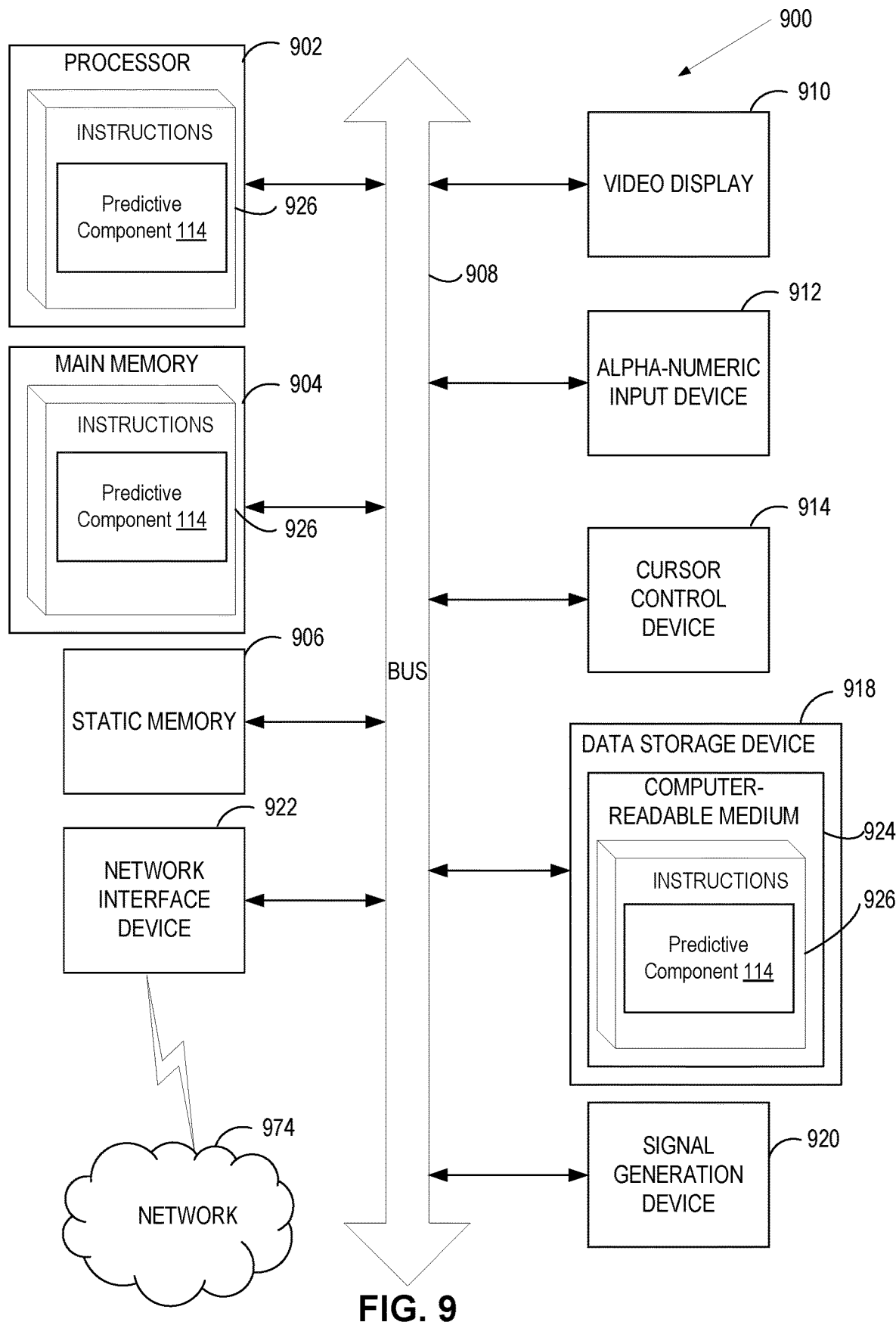
FIG. 9 is a block diagram illustrating a computer system, according to certain embodiments.

FIG. 9 is a block diagram illustrating a computer system 900, according to certain embodiments. In some embodiments, computer system 900 may be connected (e.g., via a network, such as a Local Area Network (LAN), an intranet, an extranet, or the Internet) to other computer systems. Computer system 900 may operate in the capacity of a server or a client computer in a client-server environment, or as a peer computer in a peer-to-peer or distributed network environment. Computer system 900 may be provided by a personal computer (PC), a tablet PC, a Set-Top Box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 900 may include a processing device 902, a volatile memory 904 (e.g., Random Access Memory (RAM)), a non-volatile memory 906 (e.g., Read-Only Memory (ROM) or Electrically-Erasable Programmable ROM (EEPROM)), and a data storage device 918, which may communicate with each other via a bus 908.

Processing device 902 may be provided by one or more processors such as a general purpose processor (such as, for example, a Complex Instruction Set Computing (CISC) microprocessor, a Reduced Instruction Set Computing (RISC) microprocessor, a Very Long Instruction Word (VLIW) microprocessor, a microprocessor implementing other types of instruction sets, or a microprocessor implementing a combination of types of instruction sets) or a specialized processor (such as, for example, an Application Specific Integrated Circuit (ASIC), a Field Programmable Gate Array (FPGA), a Digital Signal Processor (DSP), or a network processor).

Computer system 900 may further include a network interface device 922 (e.g., coupled to network 974). Computer system 900 also may include a video display unit 910 (e.g., an LCD), an alphanumeric input device 912 (e.g., a keyboard), a cursor control device 914 (e.g., a mouse), and a signal generation device 920.

In some embodiments, data storage device 918 may include a non-transitory computer-readable storage medium 924 (e.g., non-transitory machine-readable storage medium) on which may store instructions 926 encoding any one or more of the methods or functions described herein, including instructions encoding components of FIG. 1 (e.g., predictive component 114, model 190, etc.) and for implementing methods described herein. The instructions may, when executed, cause a processing device to perform the methods described herein.

Instructions 926 may also reside, completely or partially, within volatile memory 904 and/or within processing device 902 during execution thereof by computer system 900, hence, volatile memory 904 and processing device 902 may also constitute machine-readable storage media.

While computer-readable storage medium 924 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "receiving," "performing," "providing," "obtaining," "causing," "accessing," "determining," "adding," "using," "training," "reducing," "generating," "correcting," "scheduling," "updating," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods described herein and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and embodiments, it will be recognized that the present disclosure is not limited to the examples and embodiments described. The scope of the disclosure should be determined with reference to the following claims, along with the full scope of equivalents to which the claims are entitled.

The invention claimed is:

1. A method comprising:
receiving one or more fingerprint dimensions to be used to generate a first fingerprint;
receiving trace data associated with a manufacturing process;
applying the one or more fingerprint dimensions to the trace data to generate at least one feature;
generating the first fingerprint based on the at least one feature; and
causing, based on the first fingerprint, performance of a corrective action associated with one or more manufacturing processes.

2. The method of claim 1, wherein each of the one or more fingerprint dimensions comprises a respective set of instructions corresponding to a change in trace data, wherein the applying of the one or more fingerprint dimensions to the trace data comprises executing at least one respective set of instructions on the trace data to identify a portion of the trace data that corresponds to the change in trace data, and wherein the at least one feature is based on the portion of the trace data.

3. The method of claim 1, wherein the first fingerprint is not indicative of data values of the trace data.

4. The method of claim 1, wherein the at least one feature comprises one or more of a period of oscillation in the trace data, a spike in the trace data, a ramp in the trace data, or data associated with data points outside a normal range.

5. The method of claim 1, wherein the at least one feature comprises one or more of:
statistics of parameters of shapes in the trace data;
correlation data between existence of multiple features in the trace data;
correlation data between parameters of multiple features in the trace data; or
data indicative of warping of a shape in the trace data.

6. The method of claim 1, wherein the at least one feature comprises one or more of:
data describing a shape of a region representing features of trace data represented in some domain;
changes in features over time;
correlation between a feature and frequency of occurrence of another feature; or
changes in trace data associated with performance of a corrective action.

7. The method of claim 1, wherein the first fingerprint is indicative of at least one of:
one or more components of a set of manufacturing equipment associated with the manufacturing process; or
one or more corrective actions to be performed in association with the one or more components of the set of manufacturing equipment.

8. The method of claim 1, wherein causing performance of the corrective action comprises storing the first fingerprint in a fingerprint database.

9. The method of claim 1, wherein historical trace data is provided as training input to train a machine learning model to generate a trained machine learning model, wherein the applying of the one or more fingerprint dimensions to the trace data to generate the at least one feature comprises providing the trace data to the trained machine learning model.

10. The method of claim 1, further comprising:
identifying a plurality of fingerprints stored in a fingerprint database;
determining that a first feature of the first fingerprint matches a corresponding feature of a second fingerprint of the plurality of fingerprints; and
determining the corrective action based on the second fingerprint.

11. The method of claim 1, wherein the one or more fingerprint dimensions are verified and validated, wherein verifying of a fingerprint dimension comprises determining the fingerprint dimension is data agnostic, and validating the fingerprint dimension comprises determining performance of the fingerprint dimension meets a threshold.

12. The method of claim 1, wherein a plurality of fingerprints are stored in a fingerprint database, wherein the plurality of fingerprints are organized based on a hierarchical categorization, wherein the first fingerprint is to be updated based on metadata of a second fingerprint belonging to a different hierarchical category than the first fingerprint.

13. The method of claim 1, wherein the performance of the corrective action comprises one or more of:
providing an alert to a user;
scheduling preventative maintenance;
scheduling corrective maintenance;
updating a process recipe for future manufacturing processes; or
correcting for drift associated with one or more components of manufacturing equipment.

14. A non-transitory computer-readable storage medium storing instructions which, when executed, cause a processing device to perform operations comprising:
receiving one or more fingerprint dimensions to be used to generate a fingerprint;
receiving trace data associated with a manufacturing process;
applying the one or more fingerprint dimensions to the trace data to generate at least one feature;
generating the fingerprint based on the at least one feature; and
causing, based on the fingerprint, performance of a corrective action associated with one or more manufacturing processes.

15. The non-transitory computer-readable storage medium of claim 14, wherein the fingerprint is indicative of at least one of:
one or more components of a set of manufacturing equipment associated with the manufacturing process; or
one or more corrective actions to be performed in association with the one or more components of the set of manufacturing equipment.

16. The non-transitory computer-readable storage medium of claim 14, wherein the one or more fingerprint dimensions are verified and validated, wherein verifying of a fingerprint dimension comprises determining the fingerprint dimension is data agnostic, and validating the fingerprint dimension comprises determining performance of the fingerprint dimension meets a threshold.

17. A system, comprising memory and a processing device, wherein the processing device is configured to:
receive one or more fingerprint dimensions to be used to generate a fingerprint;

receive trace data associated with a manufacturing process;

apply the one or more fingerprint dimensions to the trace data to generate at least one feature;

generate the fingerprint based on the at least one feature; and cause, based on the fingerprint, performance of a corrective action associated with one or more manufacturing processes.

18. The system of claim 17, wherein the fingerprint is indicative of at least one of:

one or more components of manufacturing equipment associated with the manufacturing process; or one or more corrective actions to be performed in association with the one or more components of the manufacturing process.

19. The system of claim 17, wherein to cause the performance of the corrective action, the processing device is to store the fingerprint in a fingerprint database.

20. The system of claim 17, wherein the one or more fingerprint dimensions are verified and validated, wherein verifying of a fingerprint dimension comprises determining the fingerprint dimension is data agnostic, and validating the fingerprint dimension comprises determining performance of the fingerprint dimension meets a threshold.

* * * * *